US009102227B2

(12) United States Patent
Yang et al.

(10) Patent No.: US 9,102,227 B2
(45) Date of Patent: Aug. 11, 2015

(54) ELECTRO-MECHANICAL DOUBLE-ROTOR COMPOUND HYBRID TRANSMISSION

(71) Applicant: McMaster University, Hamilton (CA)

(72) Inventors: Yinye Yang, Hamilton (CA); Ali Emadi, Burlington (CA)

(73) Assignee: McMaster University, Hamilton (CA)

( * ) Notice: Subject to any disclaimer, the term of this patent is extended or adjusted under 35 U.S.C. 154(b) by 0 days.

(21) Appl. No.: 13/954,015

(22) Filed: Jul. 30, 2013

(65) Prior Publication Data

US 2014/0031168 A1 Jan. 30, 2014

Related U.S. Application Data

(60) Provisional application No. 61/677,197, filed on Jul. 30, 2012.

(51) Int. Cl.
| | |
|---|---|
| *F16H 3/72* | (2006.01) |
| *B60K 6/547* | (2007.10) |
| *B60W 20/00* | (2006.01) |
| *B60K 6/445* | (2007.10) |
| *B60K 6/448* | (2007.10) |
| *B60K 6/26* | (2007.10) |

(52) U.S. Cl.
CPC .............. *B60K 6/547* (2013.01); *B60K 6/445* (2013.01); *B60K 6/448* (2013.01); *B60W 20/30* (2013.01); *B60K 2006/266* (2013.01); *Y10S 903/902* (2013.01); *Y10T 477/23* (2015.01)

(58) Field of Classification Search
CPC ........ B60K 6/547; B60K 6/448; B60K 6/445; B60K 2006/266; B60W 20/30

USPC ................ 475/5, 149, 146, 198; 180/65.265; 477/3

See application file for complete search history.

(56) References Cited

U.S. PATENT DOCUMENTS

| | | | |
|---|---|---|---|
| 5,558,589 A | 9/1996 | Schmidt | |
| 5,577,973 A | 11/1996 | Schmidt | |
| 5,931,757 A | 8/1999 | Schmidt | |
| 6,751,960 B2* | 6/2004 | Arimitsu et al. | ................ 60/706 |
| 6,953,409 B2 | 10/2005 | Schmidt et al. | |
| 7,110,867 B2* | 9/2006 | Imazu | ............................. 701/22 |
| 7,240,751 B2* | 7/2007 | Hoare et al. | ................ 180/65.25 |
| 8,226,514 B2* | 7/2012 | Grochowski et al. | ............. 475/5 |
| 8,801,574 B2* | 8/2014 | Heap et al. | ..................... 477/174 |

(Continued)

OTHER PUBLICATIONS

Hongcai Li et al., Research on Analysis Method and Principle of Dual-Mode Electro-mechanical Variable Transmission Program, Chinese Journal of Mechanical Engineering, Jan. 18, 2012.

*Primary Examiner* — David J Hlavka
(74) *Attorney, Agent, or Firm* — Bereskin & Parr LLP/S.E.N.C.R.L., s.r.l.

(57) ABSTRACT

A hybrid vehicle transmission including a double-rotor electric machine, two planetary gear sets, an input shaft, and an output shaft, where the input shaft, the output shaft, and a first rotor of the double-rotor electric machine are each coupled to a member of the first planetary gear set, the output shaft and a second rotor of the double-rotor electric machine are each coupled to a member of the second planetary gear set, and a member of the second planetary gear set not coupled to the output shaft or the second rotor is selectively coupled to the first rotor via a first torque transfer device, and selectively coupled to a transmission housing via a second torque transfer device.

23 Claims, 15 Drawing Sheets

(56) References Cited

U.S. PATENT DOCUMENTS

| | | | |
|---|---|---|---|
| 8,813,885 B2* | 8/2014 | Heap et al. | 180/65.265 |
| 8,818,664 B2* | 8/2014 | Lado et al. | 701/54 |
| 2003/0181276 A1* | 9/2003 | Minagawa et al. | 475/5 |
| 2007/0129198 A1* | 6/2007 | Atarashi | 475/5 |
| 2010/0045335 A1* | 2/2010 | Cawthorne et al. | 324/772 |
| 2010/0071974 A1* | 3/2010 | Akutsu et al. | 180/65.265 |
| 2010/0179009 A1* | 7/2010 | Wittkopp et al. | 475/5 |
| 2011/0143875 A1* | 6/2011 | Ono et al. | 475/5 |

\* cited by examiner

ELECTRO-MECHANICAL DOUBLE-ROTOR COMPOUND HYBRID TRANSMISSION

CROSS-REFERENCE TO RELATED APPLICATION

This application claims the benefit of U.S. Provisional Application No. 61/677,197 filed Jul. 30, 2012, the entire contents of which are hereby incorporated herein by reference.

FIELD

Embodiments disclosed herein relate generally to vehicle transmission systems, and more particularly to a transmission comprising two planetary gear sets that are connected with a prime mover (such as an internal combustion engine) and a double-rotor electric machine, for use in electric, hybrid, and plug-in hybrid electric vehicles.

BACKGROUND

Hybrid vehicles (e.g. vehicles with more than one power source for supplying power to move the vehicle) may provide increased efficiency and/or increased fuel economy when compared to vehicles powered by a single internal combustion engine.

The transmission is an important component in most hybrid electric vehicles, as the transmission combines power from, typically, an internal combustion engine and one or more electric machines. The combined power output from a hybrid transmission can be characterized as having a certain electrical to mechanical power ratio.

BRIEF DESCRIPTION OF THE DRAWINGS

For a better understanding of the described embodiments and to show more clearly how they may be carried into effect, reference will now be made, by way of example, to the accompanying drawings in which.

DESCRIPTION OF EXAMPLE EMBODIMENTS

Figure 1:
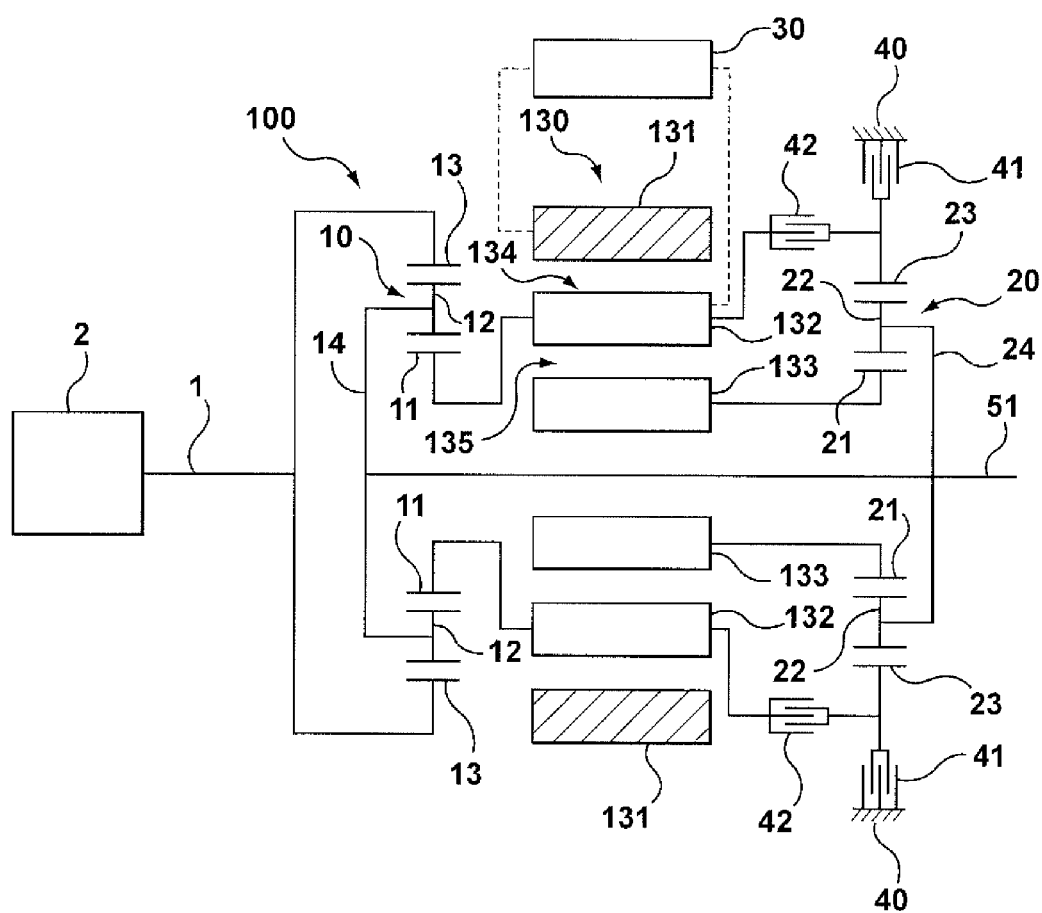
FIG. 1 is a schematic diagram of a hybrid vehicle transmission in accordance with at least one example embodiment.

Various apparatuses or methods are described below to provide an example of an embodiment of each claimed invention. No embodiment described below limits any claimed invention and any claimed invention may cover apparatuses and methods that differ from those described below. The claimed inventions are not limited to apparatuses and methods having all of the features of any one apparatus or method described below or to features common to multiple or all of the apparatuses or methods described below. It is possible that an apparatus or method described below is not an embodiment of any claimed invention. Any invention disclosed in an apparatus or method described below that is not claimed in this document may be the subject matter of another protective instrument, for example, a continuing patent application, and the applicant(s), inventor(s) and/or owner(s) do not intend to abandon, disclaim, or dedicate to the public any such invention by its disclosure in this document.

A hybrid vehicle transmission combines power from multiple sources (typically, an internal combustion engine and one or more electric machines) in order to provide motive power to the vehicle. Current examples of commercialized full hybrid transmissions include Toyota's power split hybrid transmission, and the two-mode hybrid transmission under the corporate development of GM, BMW, Chrysler, and Daimler.

The power split hybrid transmission combines mechanical power from an engine and electric power from an electrical power supply (e.g. a battery) together to power the vehicle and achieves improved fuel efficiency in comparison with non-hybrid, micro-hybrid, and mild-hybrid vehicles, within certain speed ranges and/or operating conditions of the vehicle (e.g. acceleration, braking, etc.). However, the improvement in fuel efficiency is decreased (or even eliminated) at higher vehicle speeds. Also, an electric machine with a relatively high power output rating is required to satisfy the power output demands expected under a wide variety of driving conditions.

The two-mode hybrid transmission addresses at least some of the drawbacks by providing two power split modes at different speed ranges. For example, one mode may be used for low vehicle speeds and the other for high vehicle speeds, thus achieving a relatively higher efficiency throughout the whole speed range, as compared with using either mode exclusively for all vehicle speeds. Providing two power split modes at different speed ranges may also reduce the power rating requirements for the electric machine. Two-mode hybrid transmissions may also provide four additional fixed gear ratio modes to improve vehicle performance and/or efficiency. However, two-mode hybrid transmissions typically require more mechanical and/or electrical components, resulting in a more complicated system, and generally leads to a transmission having a higher system volume, weight, and/or manufacturing costs.

The electro-mechanical double-rotor compound hybrid transmission described herein combines at least some of the benefits of a power split hybrid transmission and a two-mode hybrid transmission, while offering further operational flexibility.

In general, the electro-mechanical double-rotor compound hybrid transmission comprises two planetary gear sets. At least one of the gear members of a first planetary gear set is directly coupled to one of the gear members of a second planetary gear set, forming a mechanical path to transfer power between a prime mover input and an output of the transmission. One rotor of a double-rotor electric machine is connected to another gear member of the first planetary gear set, and the other rotor of the double-rotor electric machine is connected to another gear member of the second planetary gear set. The double-rotor electric machine is connected to an energy storage device, thus forming an electric power path to transfer power between the energy storage device and the output of the transmission.

One of the planetary gear sets is used as an input member to receive power from a prime mover and functions to split the power into the electric path and the mechanical path. The other planetary gear set is used as an output member to combine the power from the two paths.

A first torque transfer device selectively connects the third gear member of the second planetary gear set with ground. A second torque transfer device selectively connects the third gear member of the second planetary gear set to one of the gear members of the first planetary gear set, thus forming another mechanical path to transmit the prime mover power once it is engaged.

At least some embodiments of the electro-mechanical double-rotor compound hybrid transmission described herein are capable of selectively operating in one of two continuously variable transmission (CVT) modes (which may also be characterized as power sharing transmission (PST) modes), and in one of five fixed gear ratio modes. By dynamically operating the transmission in one of these modes, based on the current vehicle operating conditions (e.g. vehicle speed, acceleration or braking input), the transmission may achieve a relatively high fuel efficiency throughout a wide range of vehicular speed, while satisfying varying output demands.

Moreover, the present hybrid transmission may employ only one integrated double-rotor electric machine, which may reduce system complexity when compared with, for example, a two-mode hybrid transmission employing two separate electric machines.

Also, the present hybrid transmission may comprise only two planetary gear sets (instead of three, as may be required in other transmissions), as a result of cooperation between the rotors of the double-rotor electric machine and other torque transfer devices (e.g. mechanical clutches).

Also, the cooperation between the double rotors may function as clutches or brakes, which may result in a system that has fewer mechanical clutches or brakes as compared to known hybrid transmission systems.

Also, the relatively moderate system complexity of a transmission that integrates a double-rotor electric machine with two planetary gear sets and two torque transfer devices (typically mechanical clutches) may simplify assembly and/or reduce manufacturing costs. Also, the relatively compact volume, as compared to other hybrid vehicle transmissions, may enable such a transmission to be applied broadly into various sectors of hybrid automobiles.

In one broad aspect, there is provided a hybrid vehicle transmission comprising a first planetary gear set having a first sun gear, a first ring gear, and a first planetary carrier; an input shaft coupled to one of the first sun gear, the first ring gear, and the first planetary carrier; an output shaft coupled to another one of the first sun gear, the first ring gear, and the first planetary carrier; a double-rotor electric machine having a stator, a first rotor, and a second rotor, the first rotor coupled to the one of the first sun gear, the first ring gear, and the first planetary carrier not coupled to the input shaft or the output shaft; and a second planetary gear set having a second sun gear, a second ring gear, and a second planetary carrier; one of the second sun gear, the second ring gear, and the second planetary carrier being coupled to the output shaft; another one of the second sun gear, the second ring gear, and the second planetary carrier being coupled to the second rotor; and the one of the second sun gear, the second ring gear, and the second planetary carrier not coupled to the output shaft or the second rotor being selectively coupled to the first rotor via a first torque transfer device, and selectively coupled to a transmission housing via a second torque transfer device.

In another broad aspect, there is provided a hybrid vehicle transmission comprising a first planetary gear set having a first sun gear, a first ring gear, a plurality of first planet gears, and a first planetary carrier; an input shaft coupled to the first ring gear to transfer power between an engine and the first ring gear; a second planetary gear set having a second sun gear, a second ring gear, a plurality of second planet gears, and a second planetary carrier; an output shaft coupled to the first and second planetary carriers to transfer power between the first and second planetary carriers and the output shaft; and a double-rotor electric machine having a stator, a first rotor, and a second rotor; the second rotor being coupled to the second sun gear; the first rotor being coupled to the first sun gear and selectively coupled to the second ring gear via a first torque transfer device; and the second ring gear being selectively coupled to a transmission housing via a second torque transfer device.

In some embodiments, the double-rotor electric machine is disposed between the first and second planetary gear sets. In some embodiments, the double-rotor electric machine is disposed between the engine and the first planetary gear set.

In some embodiments, the second rotor is nested within the first rotor. In some embodiments, the first rotor is nested within the stator. In some embodiments, the stator is nested between the first rotor and the second rotor.

In some embodiments, the first rotor comprises offset first and second split rotors, the first split rotor and the stator operate as a first electric machine, and the second split rotor and the second rotor operate as a second electric machine. In some embodiments, the first split rotor is nested within the stator, and the second rotor is nested within the second split rotor.

In some embodiments, the stator comprises offset first and second stators, the first rotor is nested within the first stator, and the second rotor is nested within the second stator.

In some embodiments, at least one the first and second torque transfer devices comprises a mechanical clutch. In some embodiments, at least one the first and second torque transfer devices comprises an electro-mechanically actuated clutch.

In some embodiments, the engine comprises an internal combustion engine.

In some embodiments, the stator and the first rotor operate as a first electric machine, the first rotor and the second rotor operate as a second electric machine, the first and second electric machines are each connected to an energy storage device, and the first and second electric machines are each selectively operable as either an electric motor or as an electric generator.

In some embodiments, in a first mode of operation, the first torque transfer device is actuated to decouple the first rotor and the second ring gear, and the second ring gear is prevented from rotating relative to the transmission housing, whereby power may be transferred: between the engine and the output shaft via the first ring gear and the first planetary carrier; between the engine and the energy storage device via the first electric machine; between the first electric machine and the output shaft via the first sun gear and the first planetary carrier; and between the second electric machine and the output shaft via the second sun gear and the second planetary carrier; and in a second mode of operation, the first torque transfer device is actuated to couple the first rotor and the second ring gear, and the second ring gear is prevented from rotating relative to the transmission housing, whereby power may be transferred: between the engine and the output shaft via the first ring gear and the first planetary carrier; between the engine and the output shaft via the first ring gear, the first sun gear, the first rotor, the second ring gear, and the second planetary carrier; between the first electric machine and the output shaft via the first sun gear and the first planetary carrier; between the first electric machine and the output shaft via the second ring gear and the second planetary carrier; and between the second electric machine and the output shaft via the second sun gear and the second planetary carrier.

In some embodiments, in a third mode of operation, the first torque transfer device is actuated to decouple the first rotor and the second ring gear, the second ring gear is prevented from rotating relative to the transmission housing, and the first rotor and the second rotor are synchronized to rotate at the same rotational speed, whereby power may be transferred: between the engine and the output shaft via the first ring gear and the first planetary carrier; between the engine and the output shaft via the first ring gear, the first sun gear, the first and second rotor, the second sun gear, and the second planetary carrier; between the first electric machine and the output shaft via the first sun gear and the first planetary carrier; and between the first electric machine and the output shaft via the second rotor, the second sun gear, and the second planetary carrier; and in a fourth mode of operation, the first rotor is prevented from rotating relative to the stator, and the second ring gear is prevented from rotating relative to the transmission housing, whereby power may be transferred: between the engine and the output shaft via the first ring gear and the first planetary carrier; and between the second electric machine and the output shaft via the second sun gear and the second planetary carrier; and in a fifth mode of operation, the first torque transfer device is actuated to couple the first rotor and the second ring gear, and the first rotor and the second rotor are synchronized to rotate at the same rotational speed, whereby the rotational speeds of the input shaft and the output shaft are synchronized, and in a sixth mode of operation, the first torque transfer device is actuated to couple the first rotor and the second ring gear, and the second rotor is prevented from rotating relative to the stator, whereby the rotational speed of the output shaft is greater than the rotational speed of the input shaft, and in a seventh mode of operation, the first and second rotors are prevented from rotating relative to the stator, whereby power may be transferred: between the engine and the output shaft via the first ring gear and the first planetary carrier.

In some embodiments, the first rotor is prevented from rotating relative to the stator by selectively mechanically coupling the first rotor and at least one of the stator and the transmission housing. In some embodiments, the second rotor is prevented from rotating relative to the stator by selectively mechanically coupling the second rotor and at least one of the stator and the transmission housing. In some embodiments, the first rotor and the second rotor are synchronized to rotate at the same rotational speed by selectively mechanically coupling the first rotor and the second rotor. In some embodiments, the first and second rotors are prevented from rotating relative to the stator by: selectively mechanically coupling the first rotor and at least one of the stator, the second rotor, and the transmission housing; and selectively mechanically coupling the second rotor and at least one of the stator, the first rotor, and the transmission housing.

In some embodiments, n the fourth mode of operation: the first torque transfer device is actuated to couple the first rotor and the second ring gear, and the second torque transfer device is actuated to couple the second ring gear and the transmission housing; the first rotor is rotationally locked, and the second torque transfer device is actuated to couple the second ring gear and the transmission housing; or the first rotor is rotationally locked, and the first torque transfer device is actuated to couple the first rotor and the second ring gear.

In another broad aspect, there is provided a method of controlling a hybrid vehicle transmission, the method comprising: monitoring at least one a vehicle speed, an engine speed, a throttle input, and a brake input; determining, based on the monitoring, a target power to be transferred between an output shaft of the hybrid vehicle transmission and at least one of an engine and a double-rotor electric machine; and based on the target power, selectively operating the hybrid vehicle transmission in one of two continuously variable transmission modes or in one of five fixed gear ratio modes.

These and other aspects and features of various embodiments will be described in greater detail below. The hybrid transmissions described herein may be implemented in various hybrid electric vehicles, including plug-in hybrid vehicles, and can be implemented in hybrid vehicles having front-wheel drive, rear-wheel drive, four-wheel drive and/or all-wheel drivetrain systems.

Furthermore, the hybrid transmission may be scalable, and therefore may be applicable to vehicles including small passenger car, minivans, sports utility vehicles, pickup trucks, vans, buses, and trucks. Other applications may be possible, including off-road vehicles, tractors, mining and construction vehicles, hybrid boats and other naval applications.

Reference is now made to FIG. 1, which illustrates an example embodiment of an electro-mechanical double-rotor compound hybrid transmission 100. Transmission 100 includes two planetary gear sets, referred to generally as 10 and 20, for transferring power between a prime mover 2 (e.g. an internal combustion engine), an energy storage device 30 (e.g. a battery), and an output shaft 51.

Each planetary gear set 10, 20 contains at least three gear members: an outer ring gear, an inner sun gear, and a rotatable planetary carrier, on which a set of planet gears are rotatably mounted. The planet gears mesh with both the ring gear and the sun gear. The planetary carrier, the ring gear, and the sun gear each rotate concentrically about a central axis of the planetary gear set, while the plurality of planet gears each rotate about their own central axis as they themselves are rotated about the central axis between the ring gear and the sun gear.

The first planetary gear set 10 has: an inner gear member 11, which may be referred to as the first sun gear; an outer gear member 13, which may be referred to as the first ring gear; a plurality of planet gears 12, which may be referred to collectively as a plurality of first planet gears; and a rotatable planetary carrier 14, which may be referred to as the first planetary carrier, and to which the first planet gears 12 are rotatably mounted. Each first planet gear 12 meshes with both the first sun gear 11 and the first ring gear 13.

The ring gear 13 of the first planetary gear set 10 is coupled to an input shaft 1, which may be coupled to prime mover 2 (e.g. an internal combustion engine).

The second planetary gear set 20 has: an inner gear member 21, which may be referred to as the second sun gear; an outer gear member 23, which may be referred to as the second ring gear; a plurality of planet gears 22, which may be referred to collectively as a plurality of second planet gears; and a rotatable planetary carrier 24, which may be referred to as the second planetary carrier, and to which the second planet gears 22 are rotatably mounted. Each second planet gear 22 meshes with both the second sun gear 21 and the second ring gear 23.

The first planetary gear set 10 and the second planetary gear set 20 are compounded in that the first planetary carrier 14 of the first planetary gear set 10 and the second planetary carrier 24 of the second planetary gear set 20 are each connected to a shaft 51, which also serves as the output shaft 51 of the compound hybrid transmission 100. Since each planetary carrier 14, 24 is coupled to output shaft 51, the first and second planetary carriers will rotate at the same speed—i.e. the rotational speed of output shaft 51.

The first and second planetary gear sets are also connected via a double-rotor electric machine, referred to generally as 130. Double-rotor electric machine 130 has a stator 131 grounded with e.g. a transmission housing 40, a first rotor 132, and a second rotor 133.

In the embodiment shown in FIG. 1, stator 131 is the outer element of double-rotor electric machine 130, second rotor 133 is the innermost element, and first rotor 132 is nested concentrically between stator 131 and second rotor 133. First and second rotors 132, 133 each rotate coaxially about output shaft 51, while stator 131 typically does not rotate relative to the transmission housing. Stator 131 and first rotor 132 form a conventional electric machine 134, which may be referred to as a first electric machine, while first rotor 132 and second rotor 133 form another electric machine 135, which may be referred to as a second electric machine. In the second electric machine, there is no fixed stator but a "floating stator", in that the "stator" (i.e. first rotor 132) is actually rotatable and the relative motion between the second rotor 133 and the first rotor 132 defines the magnetic field of the second electric machine 135.

In some embodiments, each electric machine 134, 135 may be independently selectively operable as either an electric motor or as an electric generator. When operating as an electric motor, the electric machine is capable of converting electrical energy (from e.g. a battery, a capacitor, or other power source) into mechanical energy to produce an output power (or torque). When operating as an electric generator, the electric machine is capable of converting mechanical energy (from e.g. a shaft or other mechanical input) into electrical energy, which may be transferred to e.g. a battery, a capacitor, or other power source.

In some embodiments, electric machines 134, 135 may comprise various types of electric machines, including: switch reluctance machines; induction machines; synchronous reluctance machines; permanent magnet machines; and/or any combination of these aforementioned machines.

Both of the electric machines 134 and 135 are connected through energy storage device 30 (e.g. a battery) to form an electric path so that part of the power from prime mover 2 can be transferred to the energy storage device 30, and so that the energy storage device 30 may provide power into the transmission 100 via the first and/or second electric machines 134, 135.

In the embodiment shown in FIG. 1, the first rotor 132 is coupled to the sun gear 11 of the first planetary gear set 10, and the second rotor 133 is coupled to the sun gear 21 of the second planetary gear set 20. Accordingly, first sun gear 11 and first rotor 132 will rotate at the same rotational speed, and second sun gear 21 and second rotor 133 will also rotate at a common rotational speed.

A first torque transfer device 42 selectively couples ring gear 23 of the second planetary gear set 20 with the first rotor 132, thus synchronizing the rotational speeds of the ring gear 23 of the second planetary gear set 20 and the sun gear 11 of the first planetary gear set 10. First torque transfer device 42 may comprise a mechanical clutch, or an electro-mechanically actuated clutch. Coupling ring gear 23 and first rotor 132 may also be referred to as 'locking' ring gear 23 to first rotor 132.

A second torque transfer device 41 selectively couples the ring gear 23 of the second planetary gear set 20 with transmission housing 40, preventing rotation of ring gear 23. Second torque transfer device 41 may comprise a mechanical clutch, or an electro mechanically actuated clutch. Coupling ring gear 23 and first rotor 132 may also be referred to as 'locking' ring gear 23.

Where one or more of torque transfer devices 41, 42 comprises an electro-mechanically actuated clutch, it will be appreciated that, depending on the configuration of an electro-magnetic clutch, applying or removing a voltage to actuate the clutch may result in engagement or disengagement of the torque transfer device. For example, an electro-magnetic clutch may be configured such that applying a voltage to actuate (or 'engage') the clutch may disengage the members connected to the clutch to prevent power and/or torque from being transferred between the members. Conversely, actuating the clutch by removing (or not applying) a voltage to 'disengage' the clutch may result in engagement of the two members connected to the clutch to allow power and/or torque to be transferred between the members. However, in other arrangements an electro-magnetic clutch may be configured such that 'engaging' the clutch by applying a voltage to the clutch may engage the two members connected to the clutch, and 'disengaging' the clutch by removing (or not applying) a voltage may result in disengagement of the two members connected to the clutch.

In some embodiments, torque transfer devices 41, 42 may be hydraulically, mechanically and/or pneumatically actuated.

Double-rotor electric machine 130 may also function as one or more torque transfer devices by locking or synchronizing the double rotors. In some embodiments, each of the rotors 132 and 133 may be locked by an electric magnetic force (e.g. by controlling the first and/or second electric machine). Alternatively or additionally, each of the rotors 132 and 133 may be locked by applying mechanical brakes or other mechanical restraining devices (not shown) located inside or outside the double-rotor electric machine 130.

As will be appreciated, when both first rotor 132 and second rotor 133 are locked, sun gear 11 and sun gear 21 are both fixed (i.e. prevented from rotating). In this scenario, power will be transferred between the input shaft 1 and the output shaft 51 via a purely mechanical path.

A second option for double-rotor electric machine 130 to work as a torque transfer device is to synchronize the rotational speeds of first rotor 132 and second rotor 133 such that the first sun gear 11 is effectively coupled to the second sun gear 21. In other words, by 'locking' the first rotor 132 to the second rotor 133, the rotational speeds of the first and second sun gears can be synchronized. In this scenario, the second electric machine 135 neither consumes nor provides power due to the zero relative speed between the rotors 132 and 133.

A third option for double-rotor electric machine 130 to work as a torque transfer device is to lock the second rotor 133 (i.e. prevent rotor 133 from rotating), so that the sun gear 21 of the second planetary gear set 20 is also prevented from rotating. In this scenario, both the electric machines 134 and 135 are still working, and can be used to transfer power between transmission 100 and energy storage device 30.

A fourth option for the double-rotor electric machine 130 to work as a torque transfer device is to lock the first rotor 132 (i.e. prevent rotor 132 from rotating), so that first sun gear 11 is also prevented from rotating. In this scenario, the outer electric machine 134 neither consumes nor provides power due to the zero relative speed between stator 131 and first rotor 132.

Figure 2:
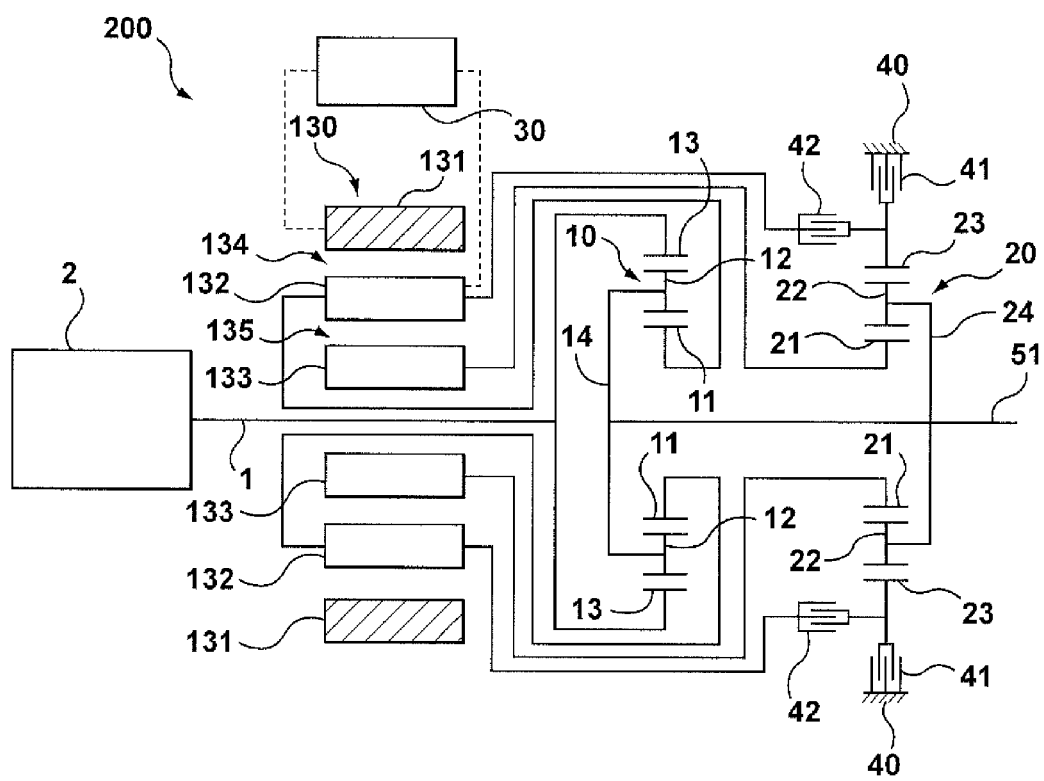
FIG. 2 is a schematic diagram of a hybrid vehicle transmission in accordance with at least one other example embodiment.
Figure 3:
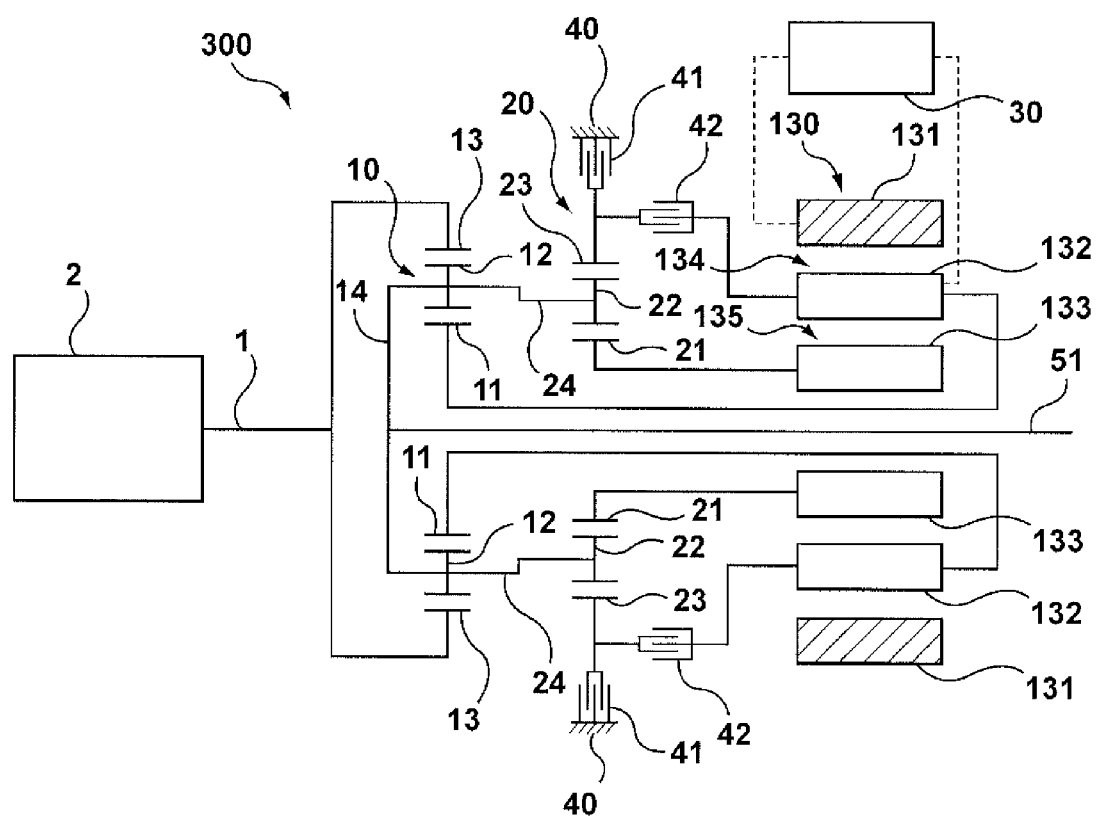
FIG. 3 is a schematic diagram of a hybrid vehicle transmission in accordance with at least one other example embodiment.

In the embodiment shown in FIG. 1, the double-rotor electric machine 130 is located between the two planetary gear sets 10 and 20. FIG. 2 depicts an alternative embodiment 200 of the electro-mechanical double-rotor compound hybrid transmission. Differing from the embodiment 100 shown in FIG. 1, in transmission 200 the first planetary gear set 10 is located between a double-rotor electric machine 130 and the second planetary gear set 20. FIG. 3 depicts another alternative embodiment 300, in which the second planetary gear set 20 is located between the first planetary gear set 10 and a double-rotor electric machine 130, and in which the first and second planetary carriers 14, 24 are coupled to each other and to output shaft 51.

Figure 4:
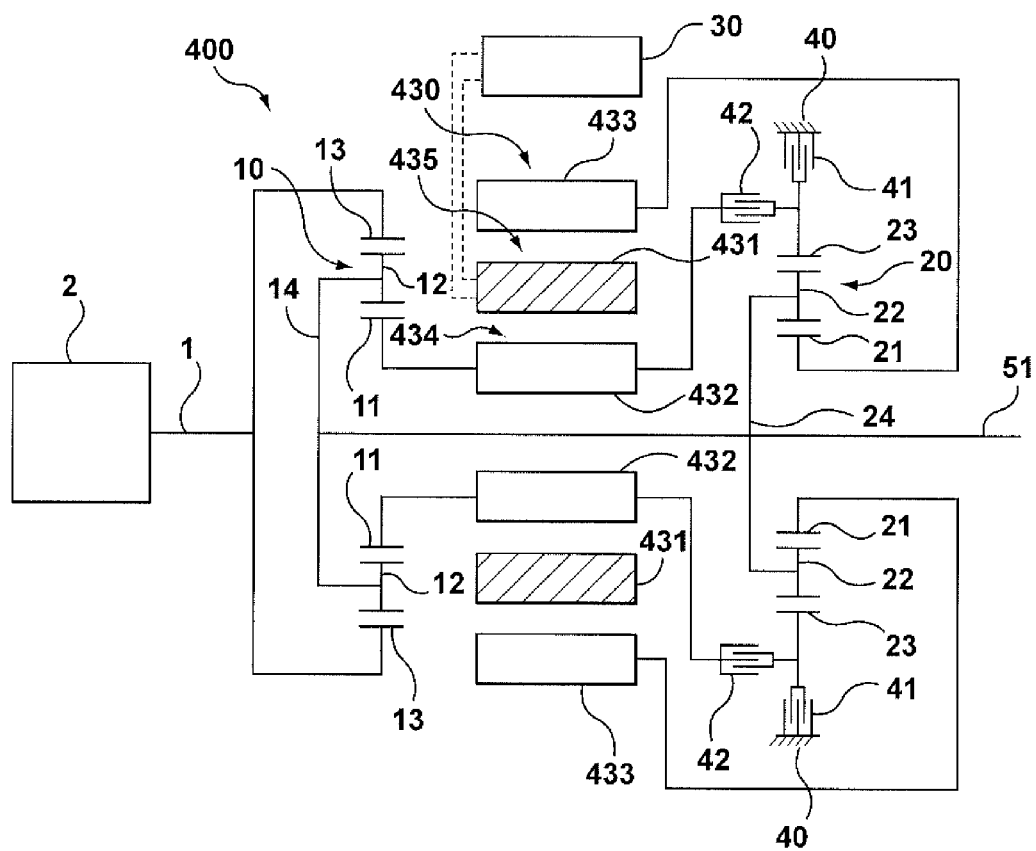
FIG. 4 is a schematic diagram of a hybrid vehicle transmission in accordance with at least one other example embodiment.

FIG. 4 depicts an alternative embodiment 400 of the electro-mechanical double-rotor compound hybrid transmission. Differing from the transmission 100 shown in FIG. 1, where stator 131 is the outer element of double-rotor electric machine 130, second rotor 133 is the innermost element, and first rotor 132 is nested concentrically between stator 131 and second rotor 133, transmission 400 uses a double-rotor electric machine 430 with a stator 431 nested between an inner (first) rotor 432 and an outer (second) rotor 433. In other words, in double-rotor electric machine 430, stator 431, which is grounded with the transmission housing 40, is concentrically sandwiched between outer rotor 433 and inner rotor 432. Both the inner rotor 432 and the outer rotor 433 rotate coaxially around output shaft 51. The stator 431 and the inner rotor 432 of the double-rotor electric machine 430 form a (first) electric machine 434 while the stator 431 and the outer rotor 433 form another (second) electric machine 435.

In this embodiment 400, one rotor, the inner rotor 432, of double-rotor electric machine 430 continuously connects to the sun gear 11 of the first planetary gear set 10. The other rotor, the outer rotor 433 in this embodiment 400, continuously connects to the sun gear 21 of the second planetary gear set 20. Both of the electric machines 434 and 435 are connected through an energy storage device 30 to form the electric path.

Figure 5:
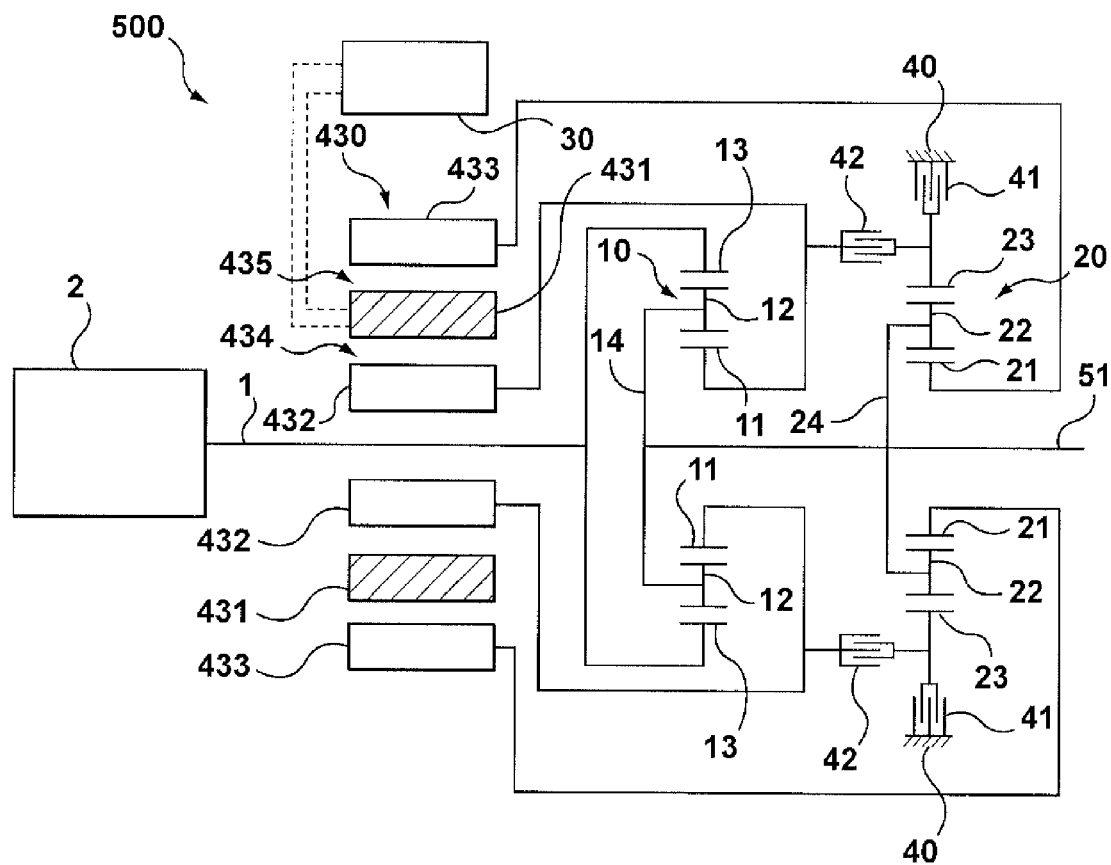
FIG. 5 is a schematic diagram of a hybrid vehicle transmission in accordance with at least one other example embodiment.
Figure 6:
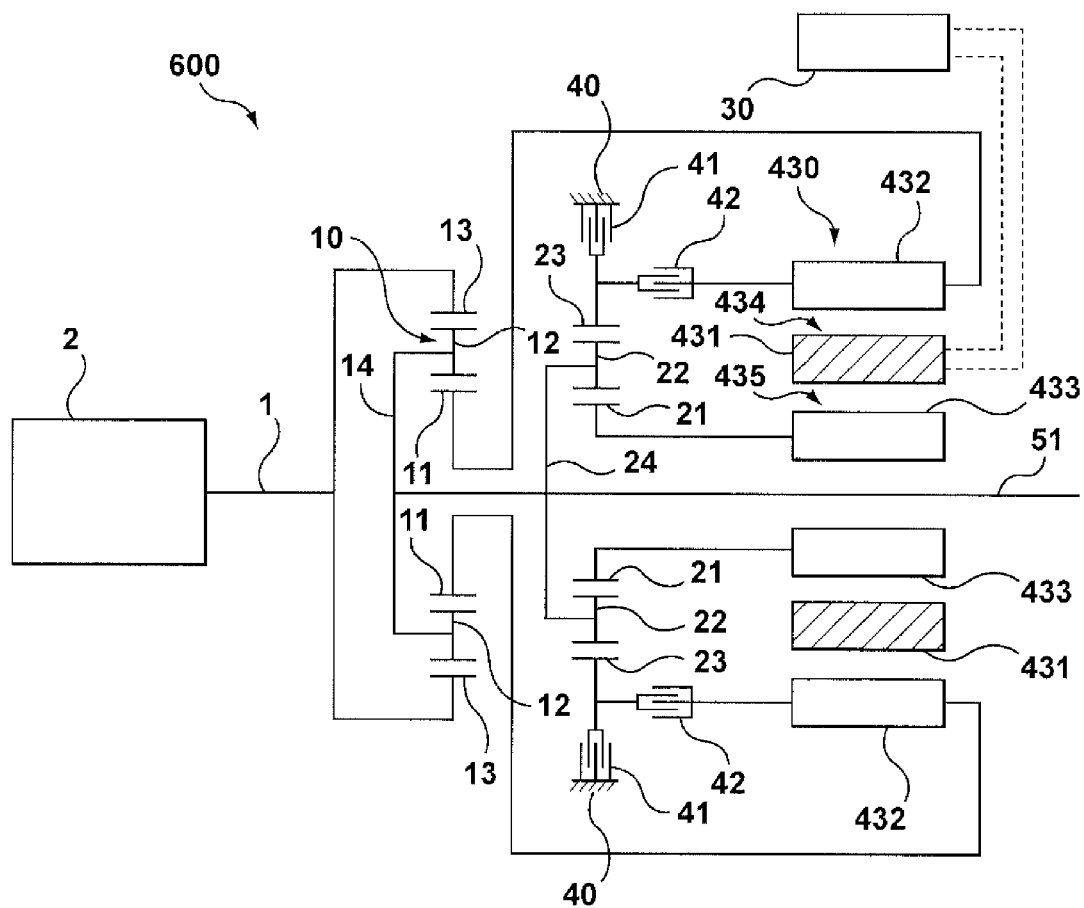
FIG. 6 is a schematic diagram of a hybrid vehicle transmission in accordance with at least one other example embodiment.

In FIG. 4, as in FIG. 1, double-rotor electric machine 430 still interconnects both planetary gear sets 10 and 20 as in the case of the embodiment 100, and the double-rotor electric machine 430 is also located between the two planetary gear sets 10 and 20. FIG. 5 depicts yet another alternative embodiment 500 of the electro-mechanical double-rotor compound hybrid transmission. Differing from the embodiment 400 of FIG. 4, in transmission 500 the first planetary gear set 10 is located between a double-rotor electric machine 430—with a stator nested between two rotors 432 and 433—and the second planetary gear set 20. FIG. 6 depicts another alternative embodiment 600, in which the second planetary gear set 20 is located between the first planetary gear set 10 and a double-rotor electric machine 430.

Figure 7:
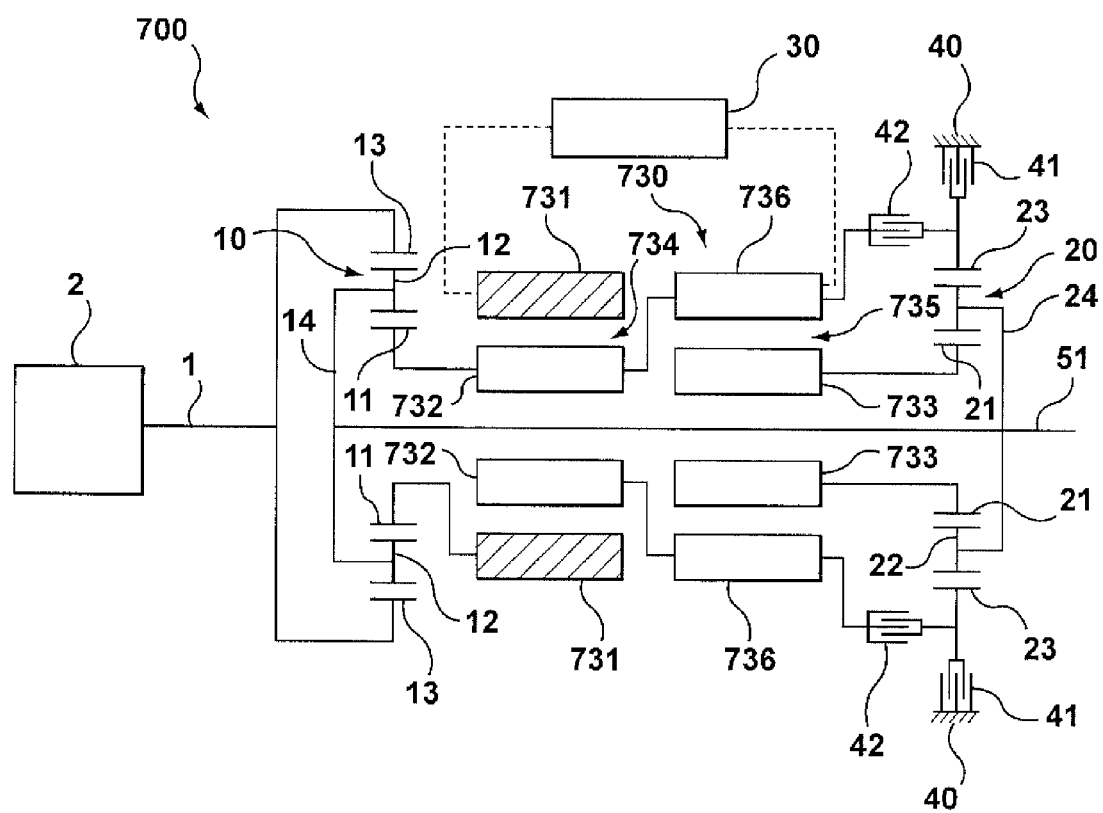
FIG. 7 is a schematic diagram of a hybrid vehicle transmission in accordance with at least one other example embodiment.

FIG. 7 depicts another embodiment 700 of an electro-mechanical double-rotor compound hybrid transmission. Differing from the embodiment 100 shown in FIG. 1, transmission 700 uses a split double-rotor electric machine 730 instead of double-rotor electric machine 130, which may allow the transmission 700 to have a smaller diameter relative to transmission 100.

Split double-rotor electric machine 730 still interconnects both planetary gear sets 10, 20 as in the case of transmission 100, and the split double-rotor electric machine 730 is also located in between the two planetary gear sets 10 and 20. However, in transmission 700, a first rotor of the split double-rotor electric machine 730 comprises two connected, laterally offset rotors: a first split rotor 732 and a second split rotor 736. A stator 731, which is grounded with the transmission housing 40, coaxially surrounds first split rotor 732 of the split double-rotor electric machine 730. Second rotor 733 is nested concentrically within the second split rotor 736 and also rotates coaxially around the output shaft 51. Stator 731 and first split rotor 732 form a conventional electric machine 734, while the second split rotor 736 and the second rotor 733 form another electric machine 735, in which there is no fixed stator but a "floating stator", in that the "stator" 736 is actually rotatable and the relative motion between the second split rotor 736 and the second rotor 733 defines the magnetic field of the second electric machine 735. Since first split rotor 732 and second split rotor 736 are coupled together, the first and second split rotors will rotate at the same speed.

In the embodiment shown in FIG. 7, first split rotor 732 is coupled to the sun gear 11 of the first planetary gear set 10 and selectively coupled, via torque transfer device 42, to the ring gear 23 of the second planetary gear set 20. The other rotor of split double-rotor electric machine 730, second rotor 733, is coupled to the sun gear 21 of the second planetary gear set 20. Both of the electric machines 734 and 735 are connected through an energy storage device 30 to form an electric path so that part of the power from prime mover 2 can be transferred to the energy storage device 30, and so that the energy storage device 30 may provide power into the transmission 100 via the first and/or second electric machines 734, 735.

Figure 8:
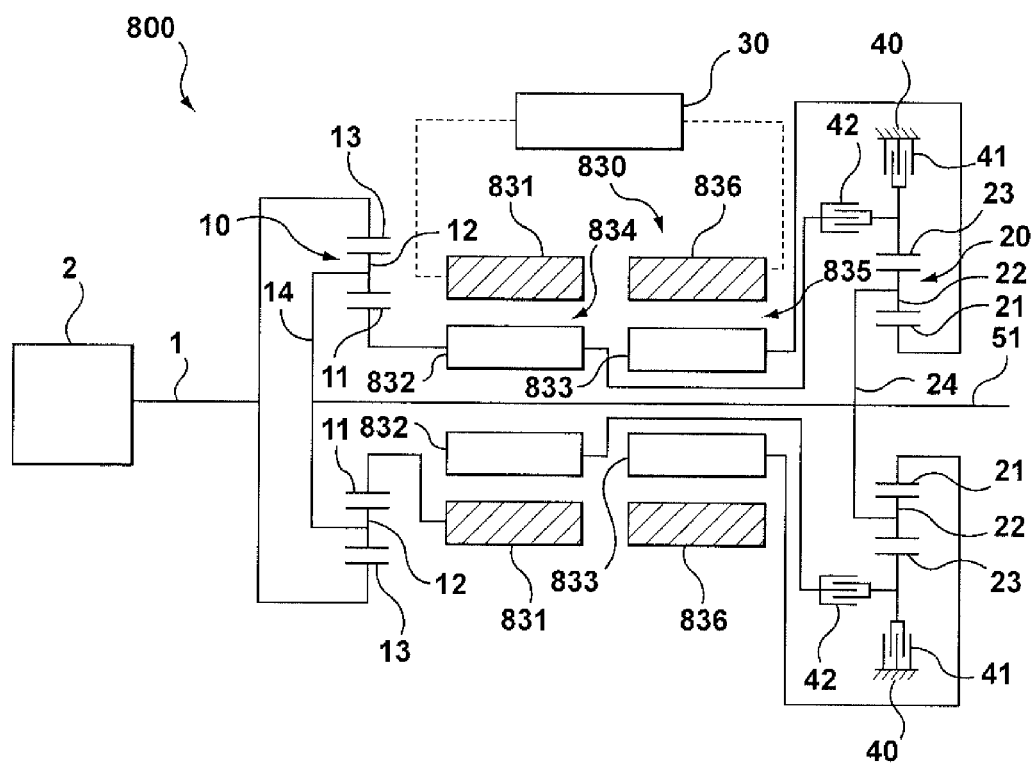
FIG. 8 is a schematic diagram of a hybrid vehicle transmission in accordance with at least one other example embodiment.

FIG. 8 depicts another alternative embodiment 800 of the electro-mechanical double-rotor compound hybrid transmission employing a split double-rotor electric machine.

Transmission 800 uses a split double-rotor electric machine 830 with two laterally offset stators: first stator 831 and second stator 836, which are grounded (e.g. to transmission housing 40). In the embodiment shown, each stator 831, 836 concentrically surrounds a rotor. Put another way, a first rotor 832 is nested within first stator 831, and a second rotor 833 is nested within second stator 836. The rotors 832, 833 each rotate coaxially about output shaft 51. First stator 831 and first rotor 832 of the split double-rotor electric machine 830 form an electric machine 834, while second stator 836 and second rotor 833 form another electric machine 835.

In the embodiment shown in FIG. 8, first rotor 832 is coupled to the sun gear 11 of the first planetary gear set 10 and selectively coupled, via torque transfer device 42, to the ring gear 23 of the second planetary gear set 20. The other rotor of split double-rotor electric machine 830, second rotor 835, is coupled to the sun gear 21 of the second planetary gear set 20. Both of the electric machines 834 and 835 are connected through an energy storage device 30 to form an electric path so that part of the power from prime mover 2 can be transferred to the energy storage device 30, and so that the energy storage device 30 may provide power into the transmission 100 via the first and/or second electric machines 834, 835.

While FIGS. 2 to 8 illustrate a number of alternative embodiments of an electro-mechanical double-rotor compound hybrid transmission, other configurations are possible. For example, the transmissions 200, 300, 400, 500, and/or 600 may be modified by substituting a split double-rotor electric machine (e.g. as shown in the transmission embodiments 700 and 800) for the double-rotor electric machine illustrated in the respective embodiments.

Also, while transmissions 100 to 800 are illustrated with input shaft 1 coupled to the ring gear 13 of the first planetary gear set, and with output shaft 51 coupled to one or both of the planetary carriers 14, 24, other configurations are possible.

Figure 9:
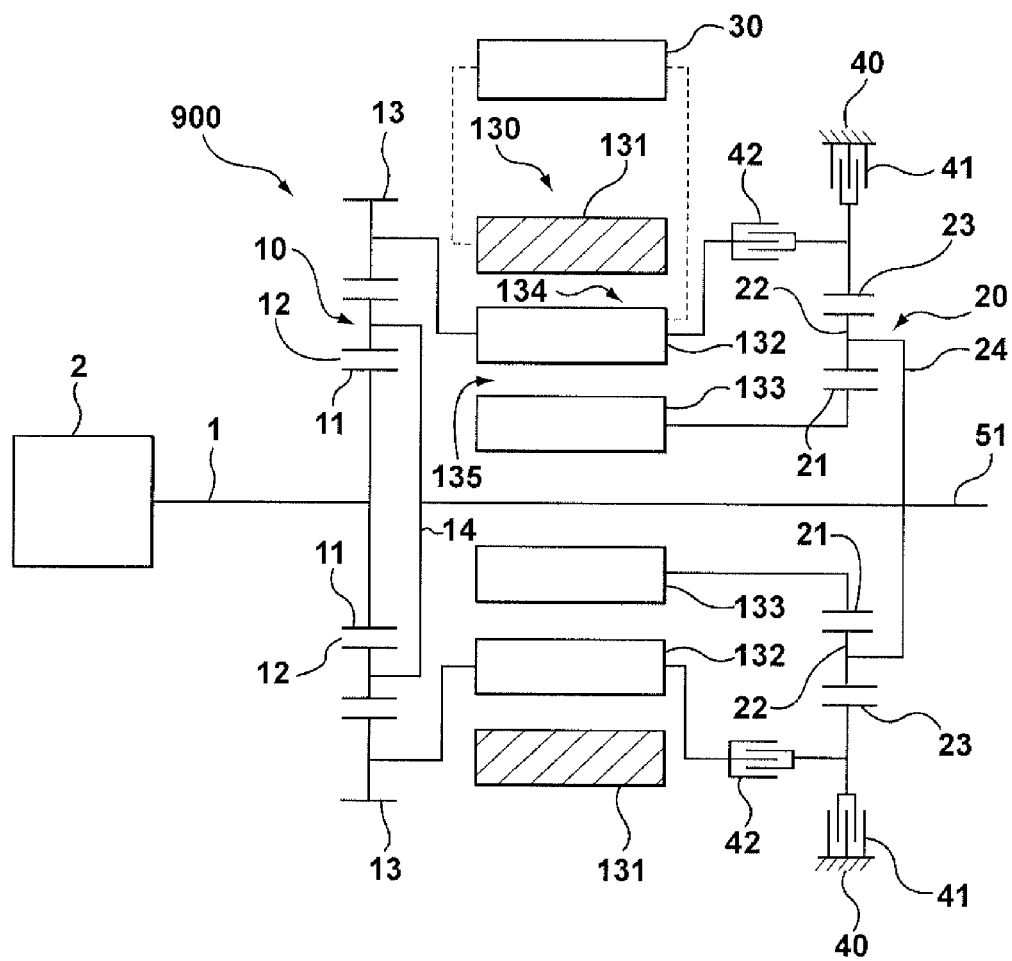
FIG. 9 is a schematic diagram of a hybrid vehicle transmission in accordance with at least one other example embodiment.

For example, in the embodiment shown in FIG. 9, sun gear 11 of the first planetary gear set 10 is coupled to input shaft 1, and ring gear 13 is coupled to first rotor 132. Otherwise, transmission 900 is generally configured in the same manner as the example embodiment of an electro-mechanical double-rotor compound hybrid transmission 100 illustrated in FIG. 1.

Figure 10:
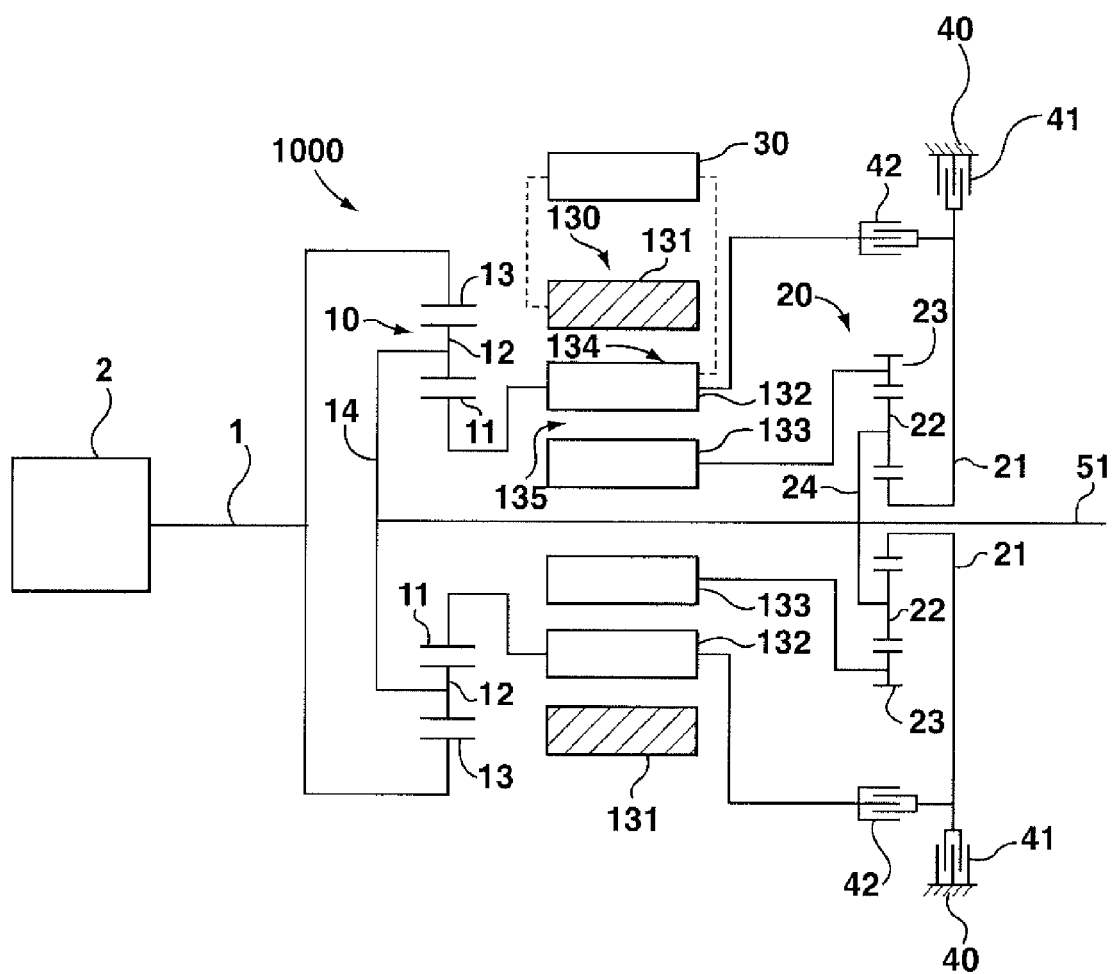
FIG. 10 is a schematic diagram of a hybrid vehicle transmission in accordance with at least one other example embodiment.

In the embodiment shown in FIG. 10, second rotor 133 is coupled to the ring gear 23 of the second planetary gear set 20, and sun gear 21 is selectively coupled to first rotor 132 and to transmission housing 40 by first and second torque transfer devices 41, 42, respectively. Otherwise, transmission 1000 is generally configured in the same manner as the example embodiment of an electro-mechanical double-rotor compound hybrid transmission 100 illustrated in FIG. 1.

Figure 11:
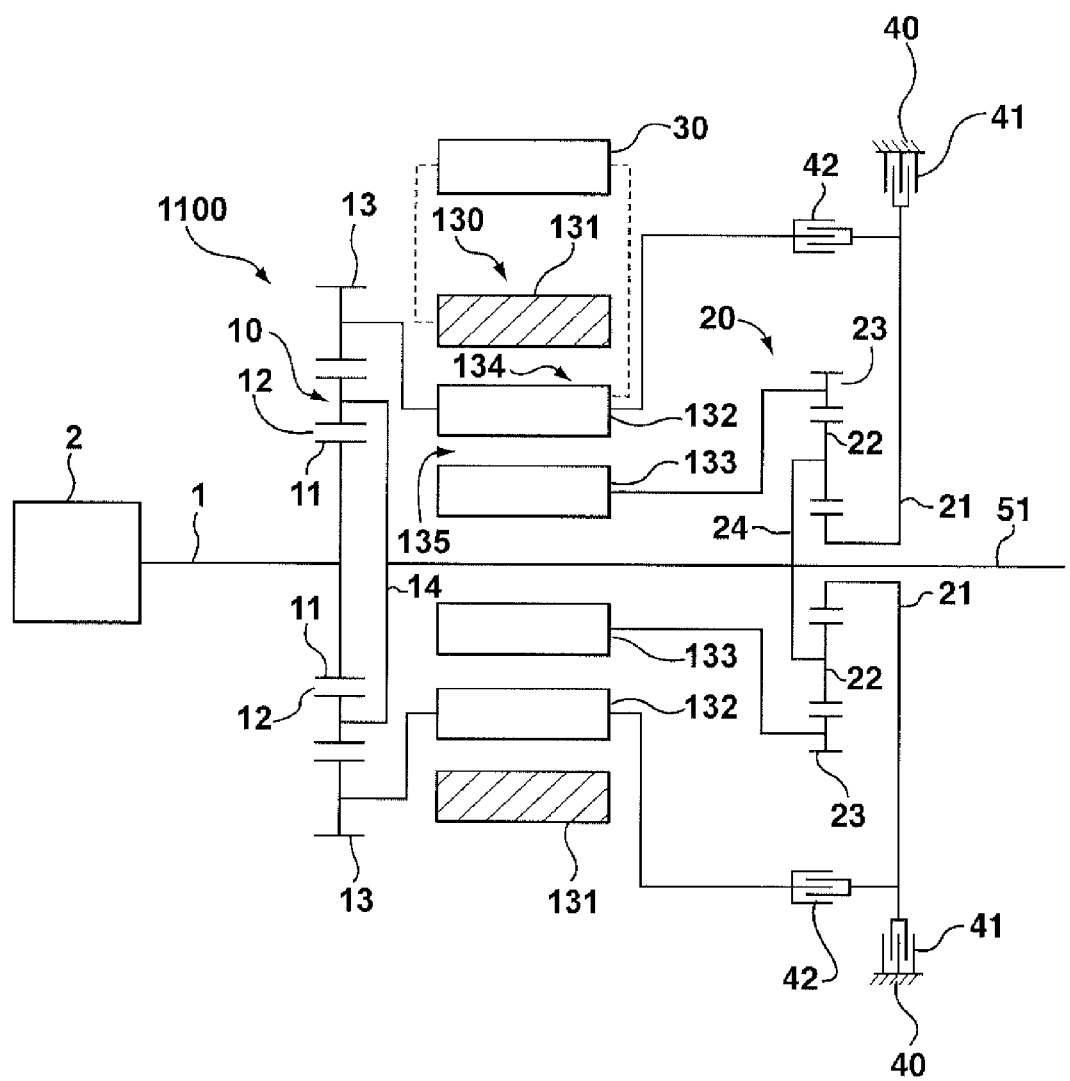
FIG. 11 is a schematic diagram of a hybrid vehicle transmission in accordance with at least one other example embodiment.

FIG. 11 depicts an embodiment with the connections to the first planetary gear set configured as shown in FIG. 9, and connections to the second planetary gear set configured as shown in FIG. 10.

Figure 12:
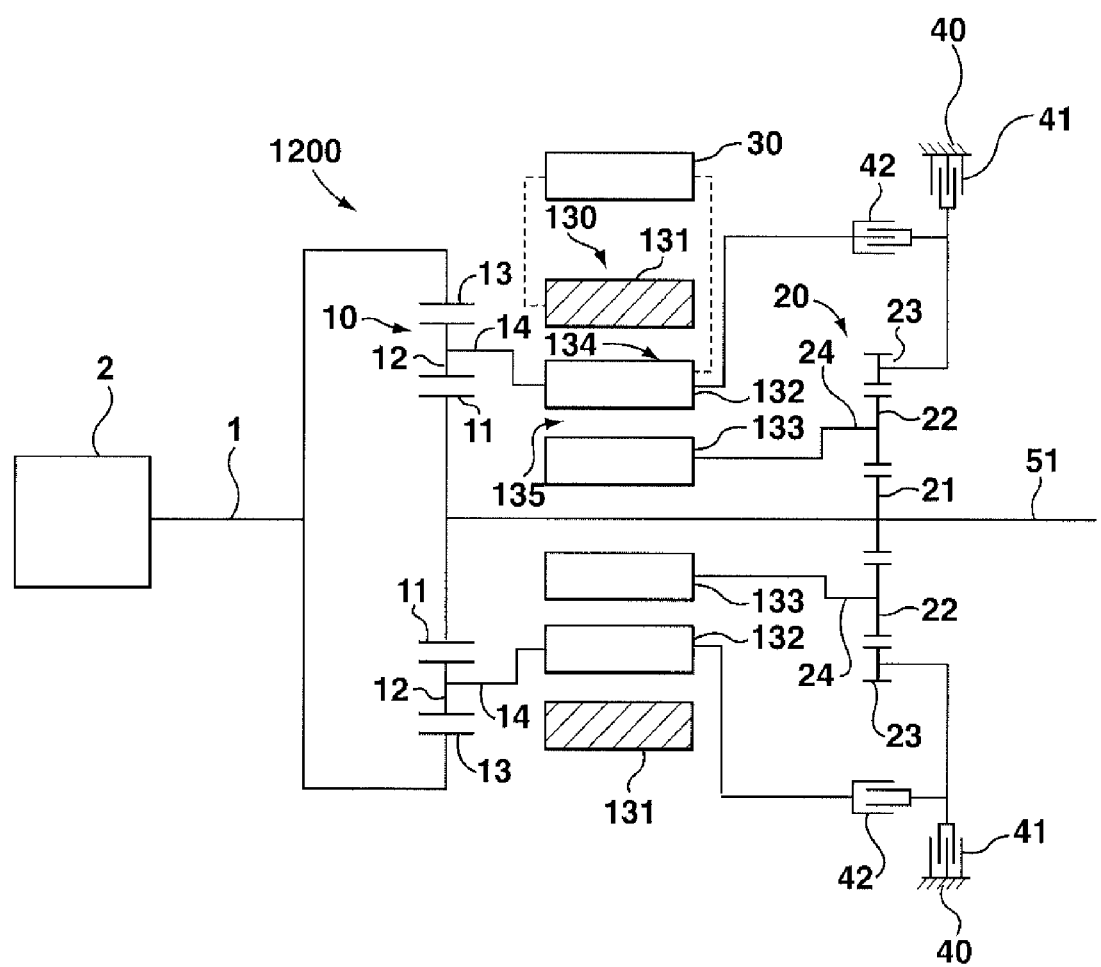
FIG. 12 is a schematic diagram of a hybrid vehicle transmission in accordance with at least one other example embodiment.

In the embodiment shown in FIG. 12, sun gear 11 of the first planetary gear set 10 is coupled to output shaft 51, and planetary carrier 12 is coupled to first rotor 132. Also, sun gear 21 of the second planetary gear set 20 is coupled to output shaft 51, and planetary 22 is coupled to second rotor 133.

While FIGS. 9 to 12 illustrate a number of alternative embodiments for coupling the first and second planetary gear sets to the input and output shafts of the electro-mechanical double-rotor compound hybrid transmission, it will be appreciated that other configurations are possible.

In operation, electro-mechanical double-rotor compound hybrid transmission 100 is a vehicular hybrid transmission capable of two continuously variable modes (CVT modes) as well as five fixed gear ratio modes (FG modes). The mode of operation of the transmission can be dynamically selected based on, for example, one or more inputs received from a driver (e.g. acceleration pedal depression, brake pedal depression) and/or one or more output demands from the driving conditions (e.g. vehicle speed, acceleration). Different modes of operation may be selected based on a desired vehicular performance (e.g. acceleration), a desired fuel efficiency, or based on a balance of vehicle performance and fuel efficiency.

In operation, one of the two continuously variable transmission modes (referred to herein as CVT1 and CVT2, for ease of reference) may generally be used when driving at relatively low vehicle speeds, and the other CVT mode may generally be used when driving at relatively high vehicle speeds. As will be discussed further below with reference to transmission 100, the continuously variable transmission modes CVT1 and CVT2 are enabled by selectively engaging the two torque transfer devices 41 and 42, so that the output (e.g. output speed, output torque, output power) of the transmission 100 is dependent on the output of both the prime mover 2, (e.g. an internal combustion engine) and the output of the double-rotor electric machine 130. Put another way, the output of the transmission can be adjusted by changing either the input from engine 2 or the input from double-rotor electric machine 130. As a result, the engine 2 can be effectively decoupled from output drive shaft 51 so that the engine 2 may be operated to produce a constant output (e.g. the engine may be operated within its high fuel efficiency range), while a variable transmission output demand may be satisfied by adjusting the input of the double-rotor electric machine 130.

First Continuously Variable Transmission Mode (CVT1)

In a first continuously variable transmission mode (CVT1), the ring gear 23 of the second planetary gear set 20 is prevented from rotating relative to transmission housing 40. In other words, ring gear 23 is grounded to transmission housing 40. This may be achieved by, for example, actuating torque transfer device 41 to couple ring gear 23 to the transmission housing 40.

Also, in CVT1 the selective connection between ring gear 23 of the second planetary gear set 20 and first rotor 132 of the double-rotor electric machine 130 is left open. In other words, torque transfer device 42 is actuated to decouple ring gear 23 and first rotor 132.

In this configuration, engine 2 provides driving power to ring gear 13 of the first planetary gear set 10 via the input shaft 1, so that ring gear 13 rotates at the same speed as input shaft 1. The first electric machine 134 defines the input speed (i.e. rotational speed) of sun gear 11, so that sun gear 11 rotates at the same speed as first rotor 132 of the double-rotor electric machine 130. Thus, the speed of engine 2 and the speed of first electric machine 134 together determine the speed of planetary carrier 14, and thus determine the speed of output shaft 51 (since the first planetary carrier 14 is coupled to output shaft 51). Also, since the planetary carrier 24 of the second planetary gear set 20 is also coupled to output shaft 51, the speed of engine 2 and the speed of first electric machine 134 together also determine the speed of the planetary carrier 24. Further, since in CVT 1 ring gear 23 is grounded to transmission housing 40 (e.g. by engaging torque transfer device 41), the speed of the second rotor 133 of the double-rotor electric machine 130 is determined as well.

The difference between the rotational speeds of second rotor 133 and first rotor 132 of double-rotor electric machine 130 forms the machine speed of second electric machine 135. Second electric machine 135 supplies torque to output shaft 51 through the connection between sun gear 21 and planetary carrier 24 of the second planetary gear set 20. The connection between planetary carrier 24 and planetary carrier 14 (i.e. output shaft 51) combines the torque from both engine 2 and double-rotor electric machine 130 to the output shaft 51.

It should be noted here that two degrees of freedom of the inputs exist in this continuously variable transmission mode. Thus, the torque from engine 2 and the torque from second electric machine 135 together determine both the output torque at the transmission output shaft 51 and the torque required from the first electric machine 134. As a result of these two degrees of freedom in transmission 100, engine 2 can be controlled to operate, for example, at or near its optimal operating speed (e.g. with the highest fuel efficiency for the average driving time) while double-rotor electric machine 130, which typically has a higher efficiency compared with the average efficiency of engine 2, can be controlled to transfer power between energy storage device 30 and transmission 100 to meet the rest of the required output speed and output torque at output shaft 51. As a result, the CVT1 mode of transmission 100 functions as a continuously variable transmission, and may achieve relatively high transmission efficiency.

In the above description, it will be appreciated that the first electric machine 134 serves as a speed regulator to engine 2, while the second electric machine 135 serves as a torque regulator.

In CVT1, power from engine 2 is input into transmission 100 via input shaft 1, and first planetary gear set 10 can be characterized as dividing the input power into separate paths. A first path (which can be characterized as a mechanical path) transfers part of the power from ring gear 13 to the planetary carrier 14, and thereafter directly to output shaft 51. The remainder of the power from engine 2 is transferred via a second path (which can be characterized as an electrical path) that comprises first electric machine 134, power electronics (not shown), energy storage device 30, and second electric machine 135. The energy storage device 30 may either serve as a consumer to store extra power from the engine 2, or it may serve as a supplier to supply electric power to the transmission via the double-rotor electric machine 130. The second planetary gear set 20 can be characterized as combining the power from both the mechanical path and the electrical path to transfer the net overall power supplied to transmission 100 from engine 2 and energy storage device 30 to output shaft 51.

As noted above, each electric machine 134, 135 may be independently selectively operable as either an electric motor or as an electric generator. For example, it is possible that first electric machine 134 may be operated as a generator to transmit part of the engine power to energy storage device 30, while the second electric machine 135 is operated as a motor to supply power from energy storage device 30 to output shaft 51. It is also possible that both the first and second electric machines 134,135 operate as generators at the same time so that power from engine 2 both supplies the overall power demanded from the output shaft 51 and supplies power to energy storage device 30 (e.g. where energy storage device 30 comprises a battery, charging the battery). It is also possible that both the first and second electric machines 134,135 operate as generators at the same time to realize a form of regenerative braking (e.g. transferring power from output shaft 51 to energy storage device 30). It is also possible to operate both electric machines 134, 135 as motors in CVT1, power to output shaft 51, in addition to the power supplied by engine 2. It is also possible to operate first electric machine 134 as a motor while operating second electric machine 135 as a generator, to retrieve the power from the output shaft 51, which may also realize a regenerative braking function.

Typically, internal combustion engines have much a lower efficiency relative to the efficiency of electric machines. Therefore, it is often desirable to operate the engine within its high fuel efficiency operation regions, making up any difference between the engine power and a required output power (i.e. power required at output shaft 51) with the electric machines. A power split ratio (i.e. a ratio between the amount of power being transferred by transmission 100 via a mechanical path and the amount of power being transferred via an electrical path) may be used as a measure of overall transmission efficiency, as the electric path of transmission 100 will generally have a lower efficiency compared with the mechanical path as a result of energy losses associated with two power conversions performed by double-rotor electric machine 130: one conversion being from mechanical power to electric power (to be stored in energy storage device 30), and the other conversion being from electric power (from energy storage device 30) back to mechanical power, to be transferred to output shaft 51. Therefore, it is also typically desirable to transfer a higher percentage of the total power from engine 2 via the mechanical path, and a lower percentage of the power from engine 2 via the electrical path. In other words, when the speed and torque output by engine 2 are constant, a hybrid transmission operating with a lower electric power split ratio is often more efficient.

Figure 13:
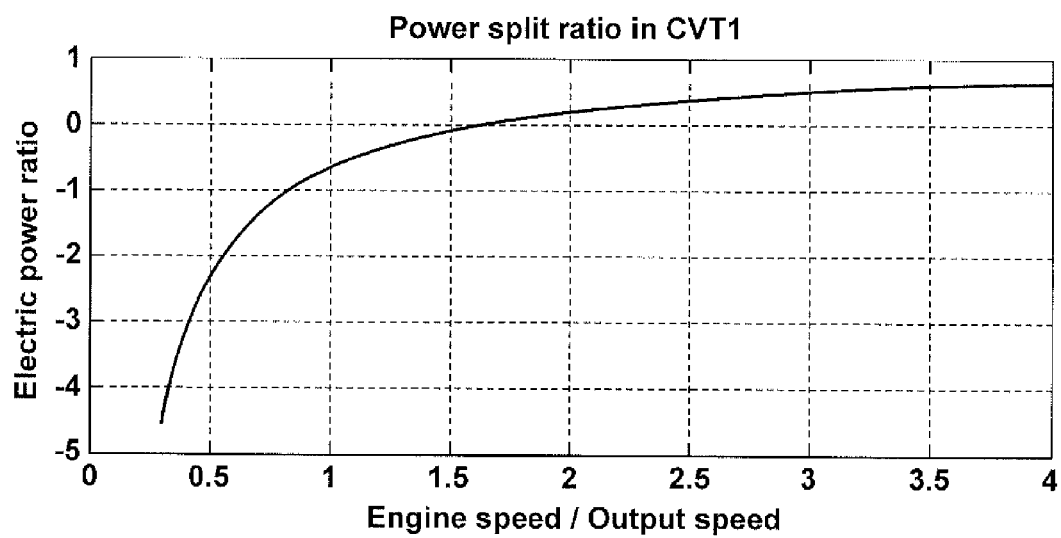
FIG. 13 is a plot of an electrical power ratio for the hybrid vehicle transmission of FIG. 1 configured to operate in a first continuously variable transmission (CVT) mode of operation, as a function of a ratio of engine speed to output shaft speed.

FIG. 13 is a plot of the electrical power split ratio for transmission 100 when operating in the CVT1 mode operation, as a function of the ratio of engine speed (i.e. the rotational speed of input shaft 1) to output speed (i.e. the rotational speed of output shaft 51). Since output shaft 51 is typically connected to the drive wheels of the vehicle in which transmission 100 is installed, the rotational speed of output shaft 51 is typically proportional to the speed of the vehicle. Accordingly, for a constant engine speed (e.g. when engine 2 is operated at its most efficient operating speed), the ratio of engine speed to output speed decreases as the vehicle speed increases.

As shown in FIG. 13, when operating with a constant engine speed in the CVT1 mode, transmission 100 has a low (but positive) electric power split ratio at lower vehicle speeds (i.e. at higher engine speed/output speed ratios), and the electric power split ratio decreases (i.e. becomes an increasingly negative value) as the output shaft speed increases. This results in lower transmission efficiency because more power is being transferred via the (less efficient) electrical path. Because of this decreasing efficiency with increasing output shaft speed (i.e. with increasing vehicle speed), a second continuously variable transmission mode is provided so that a higher transmission efficiency can be achieved at higher vehicle speeds without sacrificing the transmission performance.

Second Continuously Variable Transmission Mode (CVT2)

In the second continuously variable transmission mode (CVT2), the rotational speeds of ring gear 23 of the second planetary gear set 20 and first rotor 132 of the double-rotor electric machine 130 are synchronized. This may be achieved by, for example, actuating torque transfer device 42 to couple ring gear 23 and first rotor 132.

Also, in CVT2 ring gear 23 of the second planetary gear set 20 is permitted to rotate relative to transmission housing 40. For example, torque transfer device 41 is disengaged so that ring gear 23 of the second planetary gear set 20 is no longer grounded with the transmission housing 40.

In this configuration, as in CVT1, engine 2 provides driving power to ring gear 13 of the first planetary gear set 10 via the input shaft 1, and ring gear 13 rotates at the same speed as input shaft 1. The first electric machine 134 defines the input speed of sun gear 11, so that sun gear 11 rotates the same speed as first rotor 132 of the double-rotor electric machine 130. Thus, the speed of engine 2 and the speed of first electric machine 134 together determine the speed of planetary carrier 14, and thus determine the speed of output shaft 51 (since the first planetary carrier 14 is coupled to output shaft 51).

Also, since the planetary carrier 24 of the second planetary gear set 20 is also coupled to output shaft 51, the speed of engine 2 and the speed of first electric machine 134 together also determine the speed of the planetary carrier 24.

Differing from CVT1, in CVT2 ring gear 23 of the second planetary gear set 20 is no longer grounded. But since torque transfer device 42 is engaged to couple ring gear 23 and first rotor 132, the rotational speed of ring gear 23 is determined by the rotational speed of the first rotor 132. Since two of the three speed inputs of the second planetary gear set 20 have been determined—i.e. the speeds of ring gear 23 and planetary carrier 24—the speed of sun gear 21 is also determined. Further, with the speed of sun gear 21 determined, the speed of second rotor 133 of the double-rotor electric machine 130 is also determined.

In CVT2, power from engine 2 is input into transmission 100 via input shaft 1, and first planetary gear set 10 divides the input power into mechanical and electrical paths. One mechanical path transfers part of the power from ring gear 13 to the planetary carrier 14, and thereafter directly to output shaft 51. Differing from CVT1, an additional mechanical path is established in CVT2 by actuating torque transfer device 42 to mechanically couple sun gear 11 of the first planetary gear set 10 and ring gear 23 of the second planetary gear set 20 via first rotor 132. The remaining power from engine 2 that is not transferred via one of these mechanical paths is transferred via an electric path that comprises first electric machine 134, power electronics (not shown), energy storage device 30, and second electric machine 135.

As in CVT1, in CVT2 energy storage device 30 may either serve as a consumer to store extra power from the engine 2, or it may serve as a supplier to supply electric power to the transmission via the double-rotor electric machine 130. Also, in CVT2 the second planetary gear set 20 combines the power from the mechanical and electrical paths to transfer the net overall power supplied to transmission 100 from engine 2 and energy storage device 30 to output shaft 51.

In CVT2, the difference between the rotational speeds of second rotor 133 and first rotor 132 of double-rotor electric machine 130 forms the machine speed of second electric machine 135. Second electric machine 135 supplies torque to sun gear 21 of the second planetary gear set 20, which also combines the mechanical torques from both planetary carrier 24 and ring gear 23 of the second planetary gear set 20. Accordingly, torque from the engine 2 and torque from double-rotor electric machine 130 are transmitted to output shaft 51.

As in CVT1, two degrees of freedom of the inputs exist in CVT2, as the torque from engine 2 and the torque from second electric machine 135 together determine both the output torque at the transmission output shaft 51 and the torque required from the first electric machine 134. As in CVT1, engine 2 can be selectively operated at or near its optimal operating speed, while double-rotor electric machine 130 can be controlled to transfer sufficient power between energy storage device 30 and transmission 100 to satisfy the output speed and output torque requirements at output shaft 51.

In the above description, the first electric machine 134 serves as a speed regulator to engine 2, while the second electric machine 135 serves as a torque regulator. However, these two functions can be reversed so that second electric machine 135 serves as a speed regulator to engine 2, while first electric machine 134 serves as a torque regulator. The second electric machine 135 defines the relative speed of the first rotor 132 and the second rotor 133, thus determining the relative speed of the second ring gear 23 and the second sun gear 21. Since the speed of the output shaft 51 is known, both the speed of the ring gear 23 and the sun gear 21 can then be determined based on the motion relationships in the second planetary gear set 20. The speed of the first sun gear 11 is thus determined since the sun gear 11 is connected to the ring gear 23 in CVT2 via the first rotor 132. In addition, the speed of the first planetary carrier 14 is the same as the speed of the output shaft 51. Thus, the speed of the first ring gear 13 can be determined based on the motion relationships in the first planetary gear set 10. Therefore, by adjusting the speed of the second electric machine 135, the speed of the engine 2 can be regulated providing the speed of the output shaft 51 unchanged. On the other hand, torque from engine 2 and the torque from first electric machine 134 together determine both the output torque at the transmission output shaft 51 and the torque required from the second electric machine 135.

Also, as in CVT1, in CVT2 each electric machine 134, 135 may be independently selectively operable as either an electric motor or as an electric generator. The additional mechanical path in the CVT2 mode provides additional functionality to transmission 100, providing additional flexibility when operating the transmission throughout a wide range of speed.

In this respect, since engaging torque transfer device 42 establishes another mechanical path, the power split ratio between the mechanical path and the electric path is different in CVT2 from that in CVT1. More specifically, the mechanical connection between ring gear 23 and sun gear 11 (via first rotor 132) increases the engine power split ratio between the mechanical path and the electric path. Since a smaller portion of the engine power passes through the electric path—and is therefore subject to losses resulting from mechanical electrical power conversions—transmission efficiency is increased.

Figure 14:
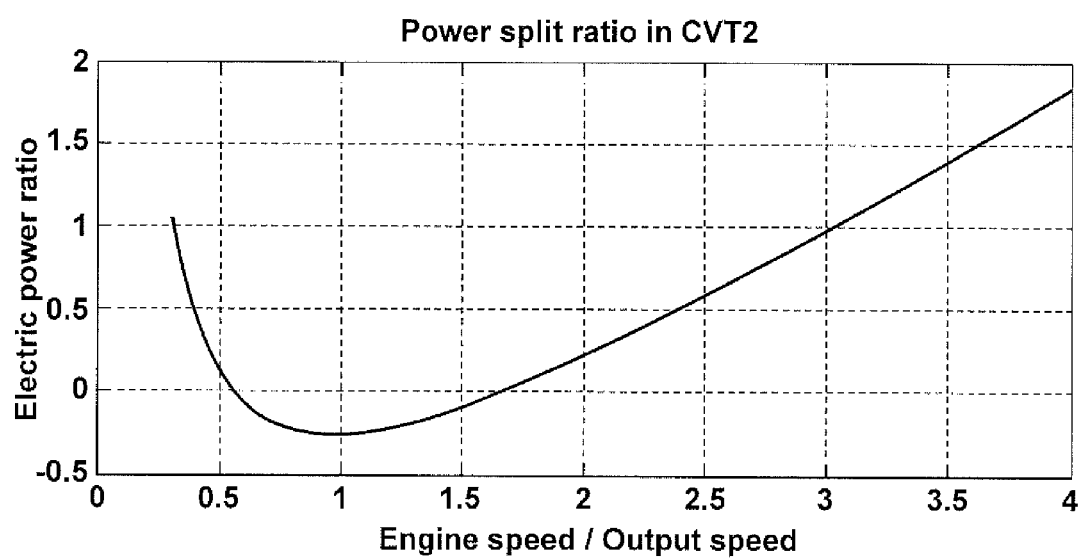
FIG. 14 is a plot of an electrical power ratio for a hybrid vehicle transmission of FIG. 1 configured to operate in a second CVT mode of operation, as a function of a ratio of engine speed to output shaft speed.

As shown in FIG. 14, when operating with a constant engine speed in the CVT2 mode, transmission 100 has a higher electric power split ratio both at lower vehicle speeds (i.e. at higher engine speed/output speed ratios), and at very high vehicle speeds (i.e. at very low engine speed/output speed ratios). In between these extremes, the electric power split ratio is relatively low. When transmission 100 is configured so that the range of engine speed to output speed ratios covers the average high speed operation range of the vehicle, a higher transmission efficiency can be achieved at higher vehicle speeds by switching from the CVT1 mode to the CVT2 mode, while still providing the benefits of a continuously variable transmission.

Figure 15:
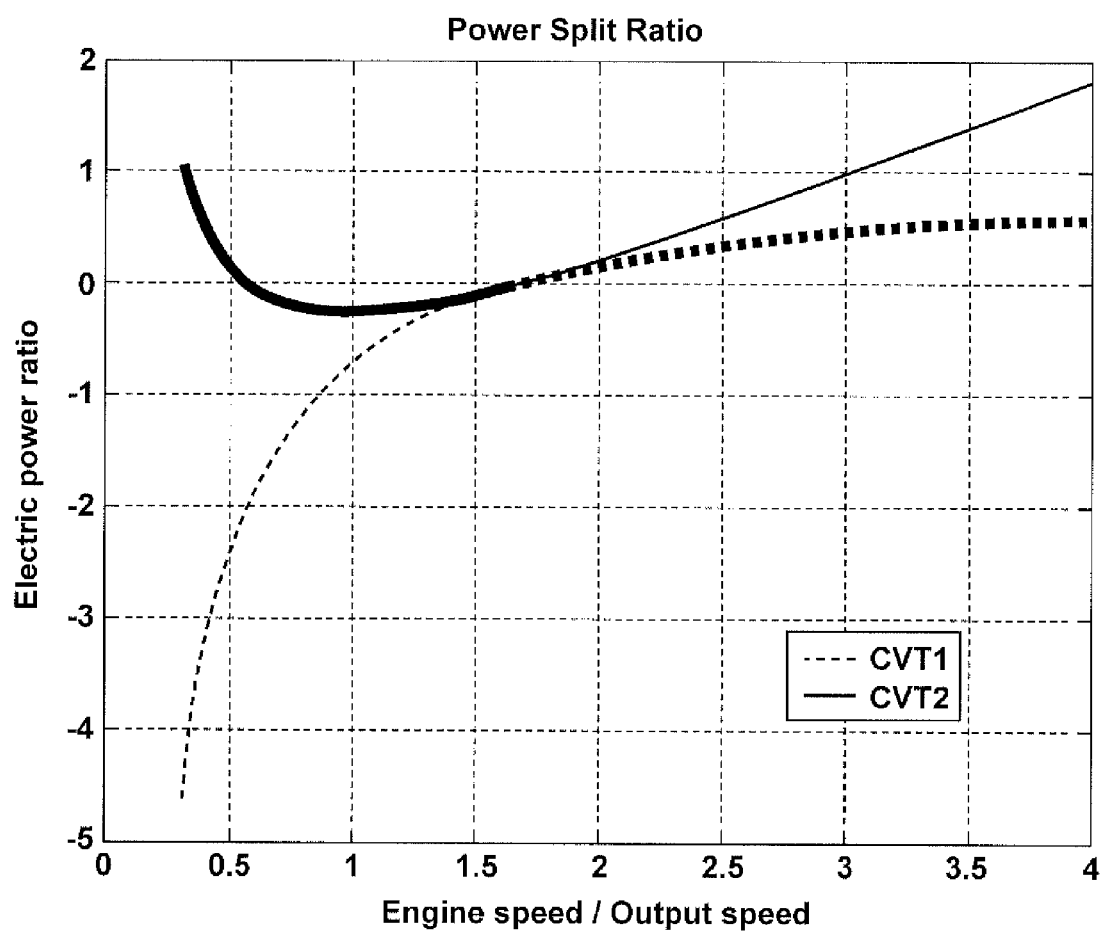
FIG. 15 is a combined plot of an electrical power ratio, as a function of a ratio of engine speed to output shaft speed, for the first and second CVT modes of operation.

This is illustrated in FIG. 15, where plots of electric power split ratios as a function of a ratio of engine speed to output shaft speed for both CVT1 and CVT2 modes of operation are shown. As emphasized by the thicker lines, since CVT1 has lower electric power split ratios at lower vehicle speeds (i.e. at higher engine speed/output speed ratios), and CVT2 has lower electric power split ratios at higher vehicle speeds (i.e. at lower engine speed/output speed ratios), operating transmission 100 in the CVT1 mode at lower vehicle speeds, and switching to the CVT2 mode at higher vehicle speeds, may provide increased efficiency (i.e. relatively low electric power split ratios) across a broader range of vehicle speeds than either CVT1 or CVT2, individually.

In addition to the CVT1 and CVT2 modes of operation, five fixed gear ratio modes of operation (referred to herein as FG1 to FG5, for ease of reference) are also provided by transmission 100 to further increase the operational flexibility and overall performance of this electro-mechanical double-rotor compound hybrid transmission. Each fixed gear ratio mode removes one degree of freedom from transmission 100 by engaging one or more torque transfer devices, so that the inputs from the engine 2 are linked to the input from the double-rotor electric machine 130. As a result, in each of the fixed gear ratio modes, the output speed of transmission 100 (i.e. the rotational speed of output shaft 51) is directly proportional to the input speed of the prime mover (i.e. the rotational speed of input shaft 1), with each fixed gear ratio mode providing a different gear ratio. These fixed gear ratio modes further enhance the operational flexibility of transmission 100, and may improve the performance and/or efficiency of transmission 100, when appropriately selected based on the present operating conditions of the vehicle.

First Fixed Gear Ratio Mode (FG1)

In a first fixed gear ratio mode (FG1), the ring gear 23 of the second planetary gear set 20 is prevented from rotating relative to transmission housing 40. In other words, ring gear 23 is grounded to transmission housing 40. This may be achieved by, for example, actuating torque transfer device 41 to couple ring gear 23 to the transmission housing 40.

Also, in FG1 first and second rotors 132 and 133 of the double-rotor electric machine 130 are synchronized to rotate at the same rotational speed. In other words, first rotor 132 and second rotor 133 are locked together. This may be achieved by, for example, selectively mechanically coupling the first rotor and the second rotor, by applying mechanical brakes inside the double-rotor electric machine, or by the control of electric magnetic force within electric machine 135. Locking the rotors 132 and 133 of the double-rotor electric machine 130, in addition to synchronizing their respective rotational speeds, establishes another mechanical path from sun gear 11 of the first planetary gear set 10 to sun gear 21 of the second planetary gear set 20 (i.e. via the double-rotor electric machine 130). The speed synchronization of the rotors 132 and 133 effectively disables the power transmission function of the second electric machine 135 due to zero relative speed between rotors 132 and 133. As a result, all of the power from engine 2 is transferred to the output shaft 51 via a mechanical path.

FG1 enables outer electric machine 134 to supply parallel power on par with engine 2. For example, FG1 can utilize double-rotor electric machine 130 to assist engine 2 during the vehicle acceleration period so that stronger torque output and shorter acceleration time can be achieved. Alternatively, electric machine 134 may be operated as a generator to transmit part of the engine power to energy storage device 30, although this will result in less power being transferred from engine 2 to output shaft 51, which may reduce the acceleration of the vehicle.

Second Fixed Gear Ratio Mode (FG2)

In a second fixed gear ratio mode (FG2), ring gear 23 is prevented from rotating relative to transmission housing 40, and first rotor 132 is prevented from rotating relative to stator 131. In other words, ring gear 23 is grounded to transmission housing 40, and first electric machine 134 is locked.

FG2 may be achieved in a number of ways. For example, first rotor 132 can be prevented from rotating by actuating first torque transfer device 42 to couple first rotor 132 and second ring gear 23, while concurrently actuating second torque transfer device 41 to couple ring gear 23 to transmission housing 40. Alternatively, first rotor 132 may be rotationally locked (for example, by selectively mechanically coupling first rotor 132 and stator 131, by applying mechanical brakes inside the double-rotor electric machine, or by the control of electric magnetic force within electric machine 134), while concurrently actuating second torque transfer device 41 to couple ring gear 23 to the transmission housing 40. As a further alternative, first rotor 132 may be rotationally locked while concurrently actuating first torque transfer device 42 to couple first rotor 132 and second ring gear 23.

Locking first rotor 132 effectively disables the power transmission function of first electric machine 134 due to zero relative speed between rotor 132 and stator 131. As a result, all of the power from engine 2 is transferred to the output shaft 51 via a mechanical path, and second electric machine 135 transfers power to transmission 100 in parallel with engine 2.

In addition to providing another fixed gear ratio mode to transmission 100, FG2 may also serve as a transitional mode between CVT1 and CVT2. For example, when operating in either CVT mode of operation, actuating whichever torque transfer device 41, 42 is not currently engaged (i.e. torque transfer device 42 when in CVT1, and torque transfer device 41 when in CVT2) will place transmission 100 into FG2. Also, when FG2 is realized by actuating first torque transfer device 42 to couple first rotor 132 and second ring gear 23, while concurrently actuating second torque transfer device 41 to couple ring gear 23 to transmission housing 40, selectively actuating either torque transfer device 41 or torque transfer device 42 to decouple their respective connection will place transmission 100 in either CVT2 or CVT1, respectively. Thus, using FG2 as an intermediary mode while transitioning between the two CVT modes may assist in providing a relatively smooth transition.

Third Fixed Gear Ratio Mode (FG3)

In a third fixed gear ratio mode (FG3), first torque transfer device 42 is actuated to couple first rotor 132 and second ring gear 23, so that first rotor 132 and second ring gear 23 rotate at the same rotational speed. Also, first and second rotors 132, 133 of the double-rotor electric machine 130 are synchronized to rotate at the same rotational speed. In other words, first rotor 132 and second rotor 133 are locked together.

In this configuration, ring gear 23 and sun gear 21 of the second planetary gear set 20 are effectively coupled together, via double-rotor electric machine 130, and as a result will have the same rotational speed. Also, synchronized ring gear 23 and sun gear 21 act together to synchronize the rotational speed of planetary carrier 24 of the second planetary gear set 20. Further, due to the mechanical connection between the planetary carriers of the first and second planetary gear sets (i.e. output shaft 51), planetary carrier 14 and sun gear 11 of the first planetary gear set 10 will have the same rotational speed as that of the gear members of the second planetary gear set 20. Further, synchronized planetary carrier 14 and sun gear 11 act together to synchronize the rotational speed of ring gear 13 of planetary gear set 10. Therefore, the ring, sun, and planetary carrier gear members of each planetary gear set 10, 20 will rotate at the same speed in FG3, resulting in a 1:1 gear ratio between input shaft 1 and output shaft 51.

Fourth Fixed Gear Ratio Mode (FG4)

In a fourth fixed gear ratio mode (FG4), first torque transfer device 42 is actuated to couple first rotor 132 and second ring gear 23, so that first rotor 132 and second ring gear 23 rotate at the same rotational speed. Also, second rotor 133 is prevented from rotating relative to stator 131. Second rotor 133 may be rotationally locked by, for example, applying mechanical brakes inside the double-rotor electric machine, or by the control of electric magnetic force within electric machine 135.

Coupling first rotor 132 and second ring gear 23 (e.g. by engaging torque transfer device 42) adds another mechanical path between the planetary gear sets, while locking inner rotor 133 of the double-rotor electric machine 130 locks sun gear 21 of the second planetary gear set 20 so that the engine power from input shaft 1 is mechanically transferred to output shaft 51 via ring gear 23 and via planetary carrier 24.

By locking a smaller gear member (i.e. sun gear 21) while using a larger gear member (i.e. ring gear 23) of second planetary gear set 20 to transfer power to output shaft 51, FG4 realizes an overdrive ratio, in that the rotational speed of output shaft 51 will be greater than the rotational speed of input shaft 1.

Fifth Fixed Gear Ratio Mode (FG5)

In a fifth gear ratio mode (FG5), first and second rotors 132, 133 of the double-rotor electric machine 130 are prevented from rotating relative to stator 131. In other words, first rotor 132 and second rotor 133 are locked, effectively disabling the power transmission function of first and second electric machines 134, 135. The rotors 132, 133 may be rotationally locked by, for example, mechanically coupling rotors 132, 133, and stator 131, by applying one or more mechanical brakes inside the double-rotor electric machine (not shown), or by the control of electric magnetic force within double-rotor electric machine 130.

With both rotors of double-rotor electric machine 130 locked, both sun gears 11, 21 are locked. As a result, all of the power from engine 2 is transferred to the output shaft 51 via a mechanical path comprising ring gear 13, planetary carrier 14, and output shaft 51. The ring gear 23 of the second planetary gear set 20 free wheels in FG5. Thus, FG5 can be characterized as an 'engine only' mode.

As described above, embodiments of an electro-mechanical double-rotor compound hybrid transmission as described herein are capable of operating in at least seven modes of operation. The modes of operation may be selected dynamically during operation of the vehicle, in response to the current operating condition of the vehicle. This operating flexibility may provide the transmission with added functional efficiency when compared to current technologies.

For example, in some embodiments a vehicle powertrain system comprising transmission 100, or a controller connected thereto, may be configured to monitor at least one vehicle operating condition, including, but not limited to vehicle speed, engine speed, throttle input, brake input, etc. Based on the at least one monitored condition, the vehicle powertrain system or controller may determine a target power to be transferred between the engine 2 and/or double-rotor electric machine 130 via output shaft 51 of transmission 100. Based on this determined target power, the vehicle powertrain system or controller may selectively operate transmission 100 to effect one of the modes of operation discussed above, which may be the mode of operation determined to be most suitable and/or efficient based on the vehicle operating condition.

While the CVT and FG modes of operation were described above primarily with reference to transmission 100, it will be appreciated that the modes of operation may be provided by variant embodiments an electro-mechanical double-rotor compound hybrid transmission, for example those embodiments illustrated in FIGS. 2 to 12.

As used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

While the above description describes features of example embodiments, it will be appreciated that some features and/or functions of the described embodiments are susceptible to modification without departing from the spirit and principles of operation of the described embodiments. For example, the various characteristics which are described by means of the represented embodiments or examples may be selectively combined with each other. Accordingly, what has been described above is intended to be illustrative of the claimed concept and non-limiting. It will be understood by persons skilled in the art that variations are possible in variant implementations and embodiments.

The invention claimed is:

1. A hybrid vehicle transmission comprising:
a first planetary gear set having a first sun gear, a first ring gear, a plurality of first planet gears, and a first planetary carrier;
an input shaft coupled to the first ring gear to transfer power between an engine and the first ring gear;
a second planetary gear set having a second sun gear, a second ring gear, a plurality of second planet gears, and a second planetary carrier;
an output shaft coupled to the first and second planetary carriers to transfer power between the first and second planetary carriers and the output shaft; and
a double-rotor electric machine having a stator, a first rotor, and a second rotor;
the second rotor being coupled to the second sun gear;
the first rotor being coupled to the first sun gear and selectively coupled to the second ring gear via a first torque transfer device; and
the second ring gear being selectively coupled to a transmission housing via, a second torque transfer device.

2. The hybrid vehicle transmission of claim 1, wherein the double-rotor electric machine is disposed between the first and second planetary gear sets.

3. The hybrid vehicle transmission of claim 1, wherein the double-rotor electric machine is disposed between the engine and the first planetary gear set.

4. The hybrid vehicle transmission of claim 1, wherein the second rotor is nested within the first rotor.

5. The hybrid vehicle transmission of claim 4, wherein the first rotor is nested within the stator.

6. The hybrid vehicle transmission of claim 4, wherein the stator is nested between the first rotor and the second rotor.

7. The hybrid vehicle transmission of claim 1, wherein the first rotor comprises offset first and second split rotors, and wherein the first split rotor and the stator operate as a first electric machine, and the second split rotor and the second rotor operate as a second electric machine.

8. The hybrid vehicle transmission of claim 7, wherein the first split rotor is nested within the stator, and the second rotor is nested within the second split rotor.

9. The hybrid vehicle transmission of claim 1, wherein the stator comprises offset first and second stators, wherein the first rotor is nested within the first stator, and the second rotor is nested within the second stator, and wherein the second torque transfer device is offset in the same direction from both the first and second stators.

10. The hybrid vehicle transmission of claim 1, wherein at least one of the first and second torque transfer devices comprises a mechanical clutch.

11. The hybrid vehicle transmission of claim 1, wherein at least one of the first and second torque transfer devices comprises an electro-mechanically actuated clutch.

12. The hybrid vehicle transmission of claim 1, wherein the engine comprises an internal combustion engine.

13. The hybrid vehicle transmission of claim 1, wherein the stator and the first rotor operate as a first electric machine, the first rotor and the second rotor operate as a second electric machine, the first and second electric machines are each connected to an energy storage device, and the first and second electric machines are each selectively operable as either an electric motor or as an electric generator.

14. The hybrid vehicle transmission of claim 13, wherein:
in a first mode of operation,
the first torque transfer device is actuated to decouple the first rotor and the second ring gear,
the second ring gear is prevented from rotating relative to the transmission housing,
whereby power may be transferred:
between the engine and the output shaft via the first ring gear and the first planetary carrier;
between the engine and the energy storage device via the first electric machine;
between the first electric machine and the output shaft via the first sun gear and the first planetary carrier; and
between the second electric machine and the output shaft via the second sun gear and the second planetary carrier; and
in a second mode of operation,
the first torque transfer device is actuated to couple the first rotor and the second ring gear, and
the second ring gear is prevented from rotating relative to the transmission housing,
whereby power may be transferred:
between the engine and the output shaft via the first ring gear and the first planetary carrier;
between the engine and the output shaft via the first ring gear, the first sun gear, the first rotor, the second ring gear, and the second planetary carrier;
between the first electric machine and the output shaft via the first sun gear and the first planetary carrier;
between the first electric machine and the output shaft via the second ring gear and the second planetary carrier; and
between the second electric machine and the output shaft via the second sun gear and the second planetary carrier.

15. The hybrid vehicle transmission of claim 14, wherein;
in a third mode of operation,
the first torque transfer device is actuated to decouple the first rotor and the second ring gear,
the second ring gear is prevented from rotating relative to the transmission housing, and
the first rotor and the second rotor are synchronized to rotate at the same rotational speed,
whereby power may be transferred:
between the engine and the output shaft via the first ring gear and the first planetary carrier;
between the engine and the output shaft via the first ring gear, the first sun gear, the first and second rotor, the second sun gear, and the second planetary carrier;
between the first electric machine and the output shaft via the first sun gear and the first planetary carrier; and
between the first electric machine and the output shaft via the second rotor, the second sun gear, and the second planetary carrier; and
in a fourth mode of operation,
the first rotor is prevented from rotating relative to the stator, and
the second ring gear is prevented from rotating relative to the transmission housing,
whereby power may be transferred:
between the engine and the output shaft via the first ring gear and the first planetary carrier; and
between the second electric machine and the output shaft via the second sun gear and the second planetary carrier; and
in a fifth mode of operation,
the first torque transfer device is actuated to couple the first rotor and the second ring gear, and
the first rotor and the second rotor are synchronized to rotate at the same rotational speed,
whereby the rotational speeds of the input shaft and the output shaft are synchronized, and
in a sixth mode of operation,
the first torque transfer device is actuated to couple the first rotor and the second ring gear, and
the second rotor is prevented from rotating relative to the stator,
whereby the rotational speed of the output shaft is greater than the rotational speed of the input shaft, and
in a seventh mode of operation,
the first and second rotors are prevented from rotating relative to the stator,
whereby power may be transferred:
between the engine and the output shaft via the first ring gear and the first planetary carrier.

16. The hybrid vehicle transmission of claim 14, wherein the first rotor is prevented from rotating relative to the stator by selectively mechanically coupling the first rotor and at least one of the stator and the transmission housing.

17. The hybrid vehicle transmission of claim 14, wherein the second rotor is prevented from rotating relative to the stator by selectively mechanically coupling the second rotor and at least one of the stator and the transmission housing.

18. The hybrid vehicle transmission of claim 15, wherein the first rotor and the second rotor are synchronized to rotate at the same rotational speed by selectively mechanically coupling the first rotor and the second rotor.

19. The hybrid vehicle transmission of claim 15, wherein the first and second rotors are prevented from rotating relative to the stator by:
selectively mechanically coupling the first rotor and at least one of the stator, the second rotor, and the transmission housing; and
selectively mechanically coupling the second rotor and at least one of the stator, the first rotor, and the transmission housing.

20. The hybrid vehicle transmission of claim 15, wherein in the fourth mode of operation:
the first torque transfer device is actuated to couple the first rotor and the second ring gear, and the second torque transfer device is actuated to couple the second ring gear and the transmission housing;
the first rotor is rotationally locked, and the second torque transfer device is actuated to couple the second ring gear and the transmission housing; or
the first rotor is rotationally locked, and the first torque transfer device is actuated to couple the first rotor and the second ring gear.

21. A hybrid vehicle transmission comprising:
a first planetary gear set having a first sun gear, a first ring gear, and a first planetary carrier;
an input shaft coupled to one of the first sun gear, the first ring gear, and the first planetary carrier;
an output shaft coupled to another one of the first sun gear, the first ring gear, and the first planetary carrier;
a double-rotor electric machine having a stator, a first rotor, and a second rotor, the first rotor coupled to the one of the first sun gear, the first ring gear, and the first planetary carrier not coupled to the input shaft or the output shaft; and a second planetary gear set having a second sun gear, a second ring gear, and a second planetary carrier;

one of the second sun gear, the second ring gear, and the second planetary carrier being coupled to the output shaft;

another one of the second sun gear, the second ring gear, and the second planetary carrier being coupled to the second rotor; and the one of the second sun gear, the second ring gear, and the second planetary carrier not coupled to the output shaft or the second rotor being selectively coupled to the first rotor via a first torque transfer device, and selectively coupled to a transmission housing via a second torque transfer device.

22. The hybrid vehicle transmission of claim 21, wherein the input shaft is coupled to the first sun gear.

23. The hybrid vehicle transmission of claim 21, wherein the output shaft is coupled to the first sun gear.

* * * * *